(12) United States Patent
Kawada

(10) Patent No.: US 8,745,150 B2
(45) Date of Patent: Jun. 3, 2014

(54) STORAGE CONTROL APPARATUS AND STORAGE CONTROL METHOD

(75) Inventor: Takashi Kawada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 343 days.

(21) Appl. No.: 13/073,131

(22) Filed: Mar. 28, 2011

(65) Prior Publication Data

US 2011/0246599 A1 Oct. 6, 2011

(30) Foreign Application Priority Data

Mar. 31, 2010 (JP) ................................. 2010-084299

(51) Int. Cl.
*G06F 15/16* (2006.01)

(52) U.S. Cl.
USPC ............................................ 709/212; 709/217

(58) Field of Classification Search
None
See application file for complete search history.

(56) References Cited

U.S. PATENT DOCUMENTS

| | | | | |
|---|---|---|---|---|
| 7,231,502 B2* | 6/2007 | Lam et al. | ...................... | 711/161 |
| 7,260,692 B1* | 8/2007 | Zahavi et al. | .................. | 711/154 |
| 7,937,448 B2* | 5/2011 | Yamagami et al. | ............ | 709/212 |
| 2004/0081148 A1* | 4/2004 | Yamada et al. | ................ | 370/389 |
| 2006/0005074 A1* | 1/2006 | Yanai et al. | ......................... | 714/5 |
| 2006/0056435 A1* | 3/2006 | Biran et al. | ..................... | 370/412 |
| 2006/0212668 A1 | 9/2006 | Furukawa et al. | | |
| 2010/0030986 A1 | 2/2010 | Shinozaki | | |
| 2010/0042795 A1* | 2/2010 | Uchida | .......................... | 711/162 |
| 2010/0058011 A1 | 3/2010 | Satoyama | | |

FOREIGN PATENT DOCUMENTS

| | | |
|---|---|---|
| JP | 2003-196032 | 7/2003 |
| JP | 2006-260292 | 9/2006 |
| JP | 2007-281972 | 10/2007 |
| JP | 2010-039574 | 2/2010 |
| JP | 2010055314 | 3/2010 |

OTHER PUBLICATIONS

Office Action of Japanese Patent Application No. 2010-084299 dated Dec. 3, 2013.

* cited by examiner

*Primary Examiner* — Bunjob Jaroenchonwanit
(74) *Attorney, Agent, or Firm* — Staas & Halsey LLP

(57) ABSTRACT

An apparatus includes a first storage unit for storing data received from the upper-layer apparatus in the first storage unit, a second storage unit, a data transmitting unit for transmitting the data stored in the first storage unit to the second storage apparatus based on an order that the data is stored in the first storage unit, a transferring unit for transferring and storing transfer data stored in the first storage unit into the second storage unit when an amount of the data stored in the first storage unit is larger than a predetermined amount, the transfer data being at least part of the data stored in the first storage unit; and, a staging unit for transferring the transfer data stored in the second storage unit into the first storage unit if an amount of the data stored in the first storage unit is smaller than a predetermined amount.

5 Claims, 29 Drawing Sheets

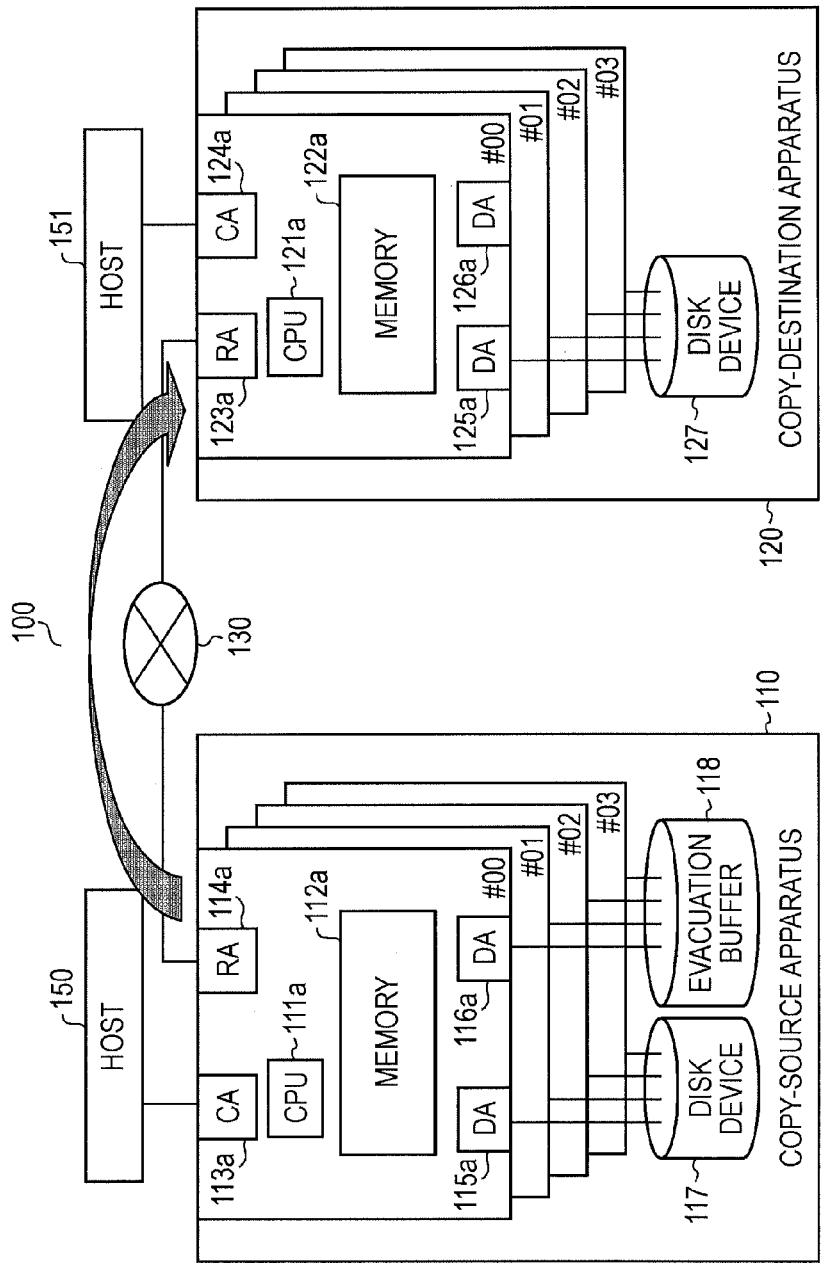

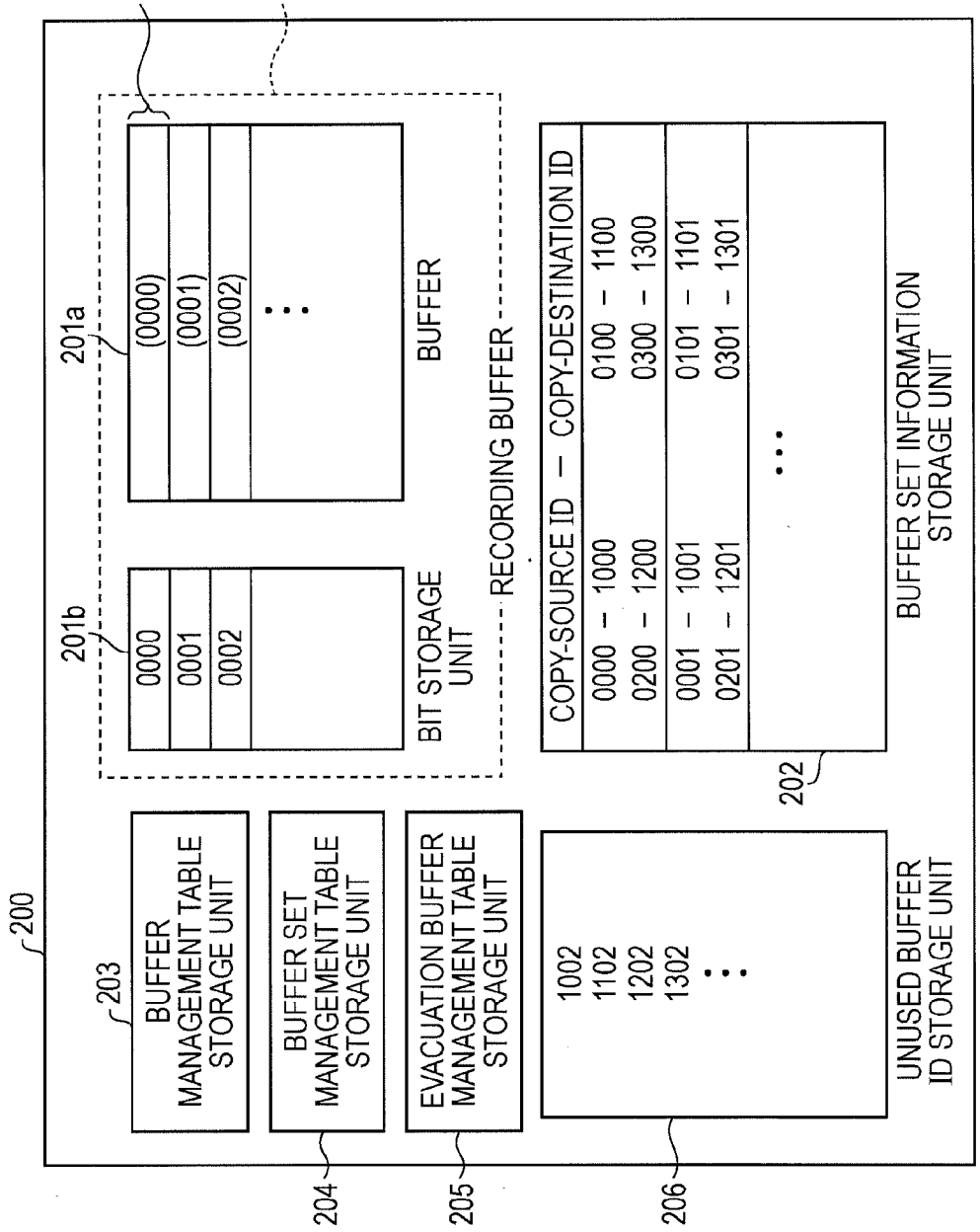

FIG. 3

| | 300 |
|---|---|
| TARGET BUFFER SET ID | 0010 |
| WRITE BACK POINTER INFORMATION | GENERATION 10 |
| STAGE POINTER INFORMATION | GENERATION 4 |
| BUFFER THRESHOLD | 4 |
| ... | ... |

| ID | USE PURPOSE | TARGET GENERATION | CONTROL MODULE NO. | BUFFER BUSY | NUMBER OF STORED DATA |
|---|---|---|---|---|---|
| 0000 | Staging | 3 | #00<br>#01<br>#02<br>#03 | Busy<br>Normal<br>Normal<br>Normal | 1024<br>90<br>80<br>70 |
| 0001 | Staging | 4 | #00<br>#01<br>#02<br>#03 | Normal<br>Normal<br>Normal<br>Normal | 80<br>80<br>80<br>70 |
| 0002 | Write Back | 8 | #00<br>#01<br>#02<br>#03 | Normal<br>Normal<br>Normal<br>Normal | 90<br>100<br>90<br>100 |
| 0003 | Write Back | 9 | #00<br>#01<br>#02<br>#03 | Normal<br>Normal<br>Normal<br>Normal | 90<br>100<br>100<br>90 |
| 0004 | STORAGE | 10 | | | 150 |

| BUFFER SWITCH CONTROL (S) | 1 |
|---|---|
| MAXIMUM SIZE OF ONE GENERATION (MB) | 8 |
| HALT WAIT STATE | No |
| STORAGE SIZE (KB) | 8 |

FIG. 6

| LAST YEAR | | | THIS YEAR | | |
|---|---|---|---|---|---|
| MONTH | DAY | POINT | MONTH | DAY | POINT |
| 1 | 1 | 000000 | 1 | 1 | 000000 |
| | 2 | 000000 | | 2 | 000000 |
| | 3 | 000000 | | 3 | |
| | 4 | | | 4 | |
| | | 000000 | | | |
| 12 | 27 | 000010 | 12 | 27 | |
| | 28 | 000010 | | 28 | |
| | 29 | 000000 | | 29 | |
| | 30 | 000000 | | 30 | |
| | 31 | 000000 | | 31 | |

FIG. 7

| LAST WEEK | | THIS WEEK | |
|---|---|---|---|
| DAY | POINT | DAY | POINT |
| MONDAY | 000000 | MONDAY | 000000 |
| TUESDAY | 000000 | TUESDAY | 000000 |
| WEDNESDAY | 000000 | WEDNESDAY | 000010 |
| THURSDAY | 000010 | THURSDAY | 000000 |
| FRIDAY | 000020 | FRIDAY | 000020 |
| SATURDAY | 000000 | SATURDAY | 000000 |
| SUNDAY | 000000 | SUNDAY | 000000 |

| | |
|---|---|
| NUMBER OF LOGICAL UNITS | 8 |
| NUMBER OF CONTROL MODULES | 4 |
| NUMBER OF EVACUATION BUFFERS | 1580032 |
| MAXIMUM NUMBER OF EVACUATION BUFFER SETS | 395008 |
| UNIT SIZE OF EVACUATION BUFFER (MB) | 1 |
| WRITE BACK EVACUATION BUFFER SET NO. | 5 |
| STAGING EVACUATION BUFFER SET NO. | 1 |

FIG. 10

| MAXIMUM NUMBER OF EVACUATION BUFFERS | 149504 |
|---|---|
| NUMBER OF IN-USE EVACUATION BUFFERS | 0 |
| NUMBER OF EMPTY EVACUATION BUFFERS | 149504 |
| SIZE OF EVACUATION BUFFER (GB) | 146 |
| LU NO. | 0 |
| EVACUATION BUFFER PERFORMANCE | 200 |

| MAXIMUM NUMBER OF EVACUATION BUFFERS | 30720 |
|---|---|
| NUMBER OF IN-USE BUFFERS | 1000 |
| NUMBER OF EMPTY BUFFERS | 29720 |
| SIZE OF EVACUATION BUFFER (GB) | 30 |
| LU NO. | 1 |
| EVACUATION BUFFER PERFORMANCE | 100 |

| EVACUATION BUFFER SET NO. | CONTROL MODULE NO. | LU NO. | EVACUATION BUFFER OFFSET | NUMBER OF EVACUATION BUFFERS |
|---|---|---|---|---|
| 0 | #00 | 0 | 0x00010 | 8 |
| | #01 | 1 | 0x10000 | 2 |
| | #02 | 2 | | |

⋮

| EVACUATION BUFFER SET NO. | CONTROL MODULE NO. | LU NO. | EVACUATION BUFFER OFFSET | NUMBER OF EVACUATION BUFFERS |
|---|---|---|---|---|
| 1 | #00 | 1 | 0x12800 | 10 |
| | #01 | 3 | 0x18000 | 6 |
| | #02 | 4 | | |

| LU NO. | #0 |
|---|---|
| 1111111111111111100000000011111111 ............... | |

| LU NO. | #1 |
|---|---|
| 1111111111111111100000000011111111 ............... | |

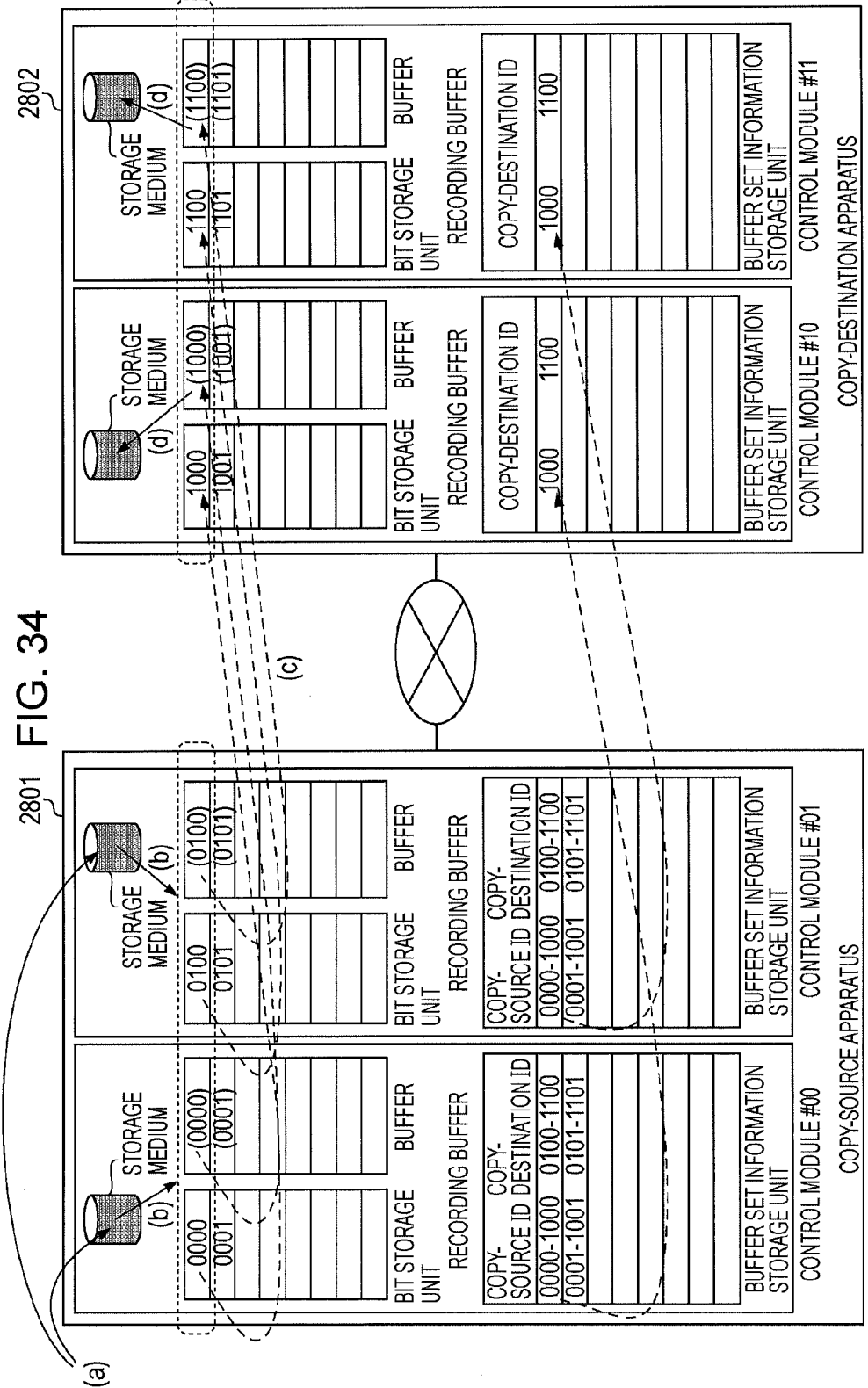

STORAGE CONTROL APPARATUS AND STORAGE CONTROL METHOD

CROSS-REFERENCE TO RELATED APPLICATION

This application is based upon and claims the benefit of priority of the prior Japanese Patent Application No. 2010-084299, filed on Mar. 31, 2010, the entire contents of which are incorporated herein by reference.

FIELD

The embodiment discussed herein is relates to a storage control apparatus, a storage control method, and a storage control program for a storage apparatus.

BACKGROUND

To improve performance and reliability, redundant arrays of inexpensive disks (RAID) apparatuses of a distributed-cache-memory storage system adopt a redundant configuration of including a plurality of control modules for controlling input of data in a storage and output of data from the storage. Each of the control modules executes processing for reading data from a logical volume and writing data in the logical volume.

To improve the reliability, such RAID apparatuses have a remote copy function, called as advanced copy, which ensures the order.

FIG. 34 is a diagram illustrating RAID apparatuses each having the order-ensuring remote copy function. More specifically, FIG. 34 illustrates a storage system including RAID apparatuses 2801 and 2802. The RAID apparatus 2801 includes control modules #00 and #01, whereas the RAID apparatus 2802 includes control modules #10 and #11.

Each of the control modules includes a recording buffer having a buffer and a buffer index table (BIT) storage unit, a buffer set information storage unit for storing buffer set information, and a storage medium for storing data.

The buffer is divided into a plurality of areas of a predetermined size. Each of the divided areas is assigned with a buffer ID and temporarily stores data stored or to be stored on the storage medium. The BIT storage unit stores BIT, i.e., information including a location of data stored in the buffer, such as a buffer ID illustrated in FIG. 34.

"(0000)" in the buffer illustrated in FIG. 34 represents buffer data stored in a buffer area having a buffer ID "0000", whereas "0000" written in the BIT storage unit represents the buffer ID.

The buffer set information storage unit stores information on a buffer set. The buffer set indicates a combination of buffer data stored in a buffer of one control module and buffer data stored in a buffer of another control module, e.g., a combination of buffer data (0000) and another buffer data (0100) enclosed by a horizontally long dotted line in the copy-source RAID apparatus 2801.

The buffer set information includes information associating buffer data with a buffer of the copy-destination RAID apparatus 2802 storing the buffer data. For example, in the buffer set information storage unit of the control module #00, buffer data stored in a buffer area having a buffer ID "0000" is associated with a buffer area having a buffer ID "1000" of the copy-destination RAID apparatus 2802 storing the buffer data.

In the foregoing configuration, upon receiving a write I/O instruction from a host computer, each of the control modules #00 and #01 stores "write data" in the storage medium in accordance with the write I/O instruction (see (a)).

At the same time, each of the control modules #00 and #01 transfers the write data to the buffer and stores the data in the buffer (see (b)). At this time, the write data is managed in units of buffer sets.

Upon completing writing of the write data in the buffer, each of the control modules #00 and #01 starts transferring the write data in units of buffer sets (see (c)). That is, the control modules #00 and #01 start remote copy.

The write data transferred from the copy-source RAID apparatus 2801 in the remote copy is stored in a buffer of each of the control modules #10 and #11 of the copy-destination RAID apparatus 2802 in accordance with the buffer set information. Each of the control modules #10 and #11 then reflects the write data stored in the buffer in the storage medium (see (d)).

After the completion of the foregoing processing, each of the control modules of the copy-source RAID apparatus 2801 and the copy-destination RAID apparatus 2802 frees the buffer.

As described above, the data is collectively transmitted using the recording buffer and the buffer sets are collectively controlled. In the copy-destination RAID apparatus 2802 on the other hand, the data is stored on the storage media in units of buffer sets. In this way, the order is ensured.

Additionally, as described above, since write data waiting to be transmitted because of communication speed is accumulated in the advanced copy, a larger buffer is needed for lower communication speed. A memory (hereinafter, referred to as a buffer memory) is used as the buffer because the buffer desirably has high speed. However, mounting a memory of a large capacity is difficult because of issues, such as cost. Thus, when an amount of copy data waiting to be transmitted exceeds the capacity of the buffer memory, a disk (hereinafter, referred to as a buffer disk) may be used for temporarily evacuating (writing back) the copy data. The data stored in the buffer disk is managed based on generations to ensure the order. As soon as a space becomes available in the buffer memory, the data stored in the buffer disk is written in the buffer memory from the oldest generation (staging).

Japanese Laid-open Patent Publication No. 2006-260292 is an example of related art.

SUMMARY

According to an aspect of the invention, a storage control apparatus includes a first storage unit for storing data received from the upper-layer apparatus in the first storage unit, a second storage unit, a data transmitting unit for transmitting the data stored in the first storage unit to the second storage apparatus based on an order that the data is stored in the first storage unit, a transferring unit for transferring and storing transfer data stored in the first storage unit into the second storage unit when an amount of the data stored in the first storage unit is larger than a predetermined amount, the transfer data being at least part of the data stored in the first storage unit; and, a staging unit for transferring the transfer data stored in the second storage unit into the first storage unit if an amount of the data stored in the first storage unit is smaller than a predetermined amount.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating an overview of a configuration of a storage system.

FIG. 2 is a diagram illustrating an example of a specific configuration of a memory included in a control module.

FIG. 3 is a diagram illustrating an example of a configuration of a buffer management table.

FIG. 4 is a diagram illustrating an example of a configuration of a buffer set management table.

FIG. 5 is a diagram illustrating an example of a configuration of an order-ensuring remote copy management table.

FIG. 6 is a diagram illustrating an example of a configuration of a date-based point table.

FIG. 7 is a diagram illustrating an example of a configuration of a day-based point table.

FIG. 8 is a diagram illustrating an overall evacuation buffer management table.

FIG. 10 is a diagram illustrating an example of a configuration of a logical unit (LU) management table.

FIG. 11 is a diagram illustrating an example of a configuration of an evacuation buffer set management table.

FIG. 12 is a diagram illustrating an example of a configuration of an empty evacuation buffer management table.

FIG. 34 is a diagram describing RAID apparatuses having an order-ensuring remote copy function.

DESCRIPTION OF EMBODIMENTS

Figure 9:
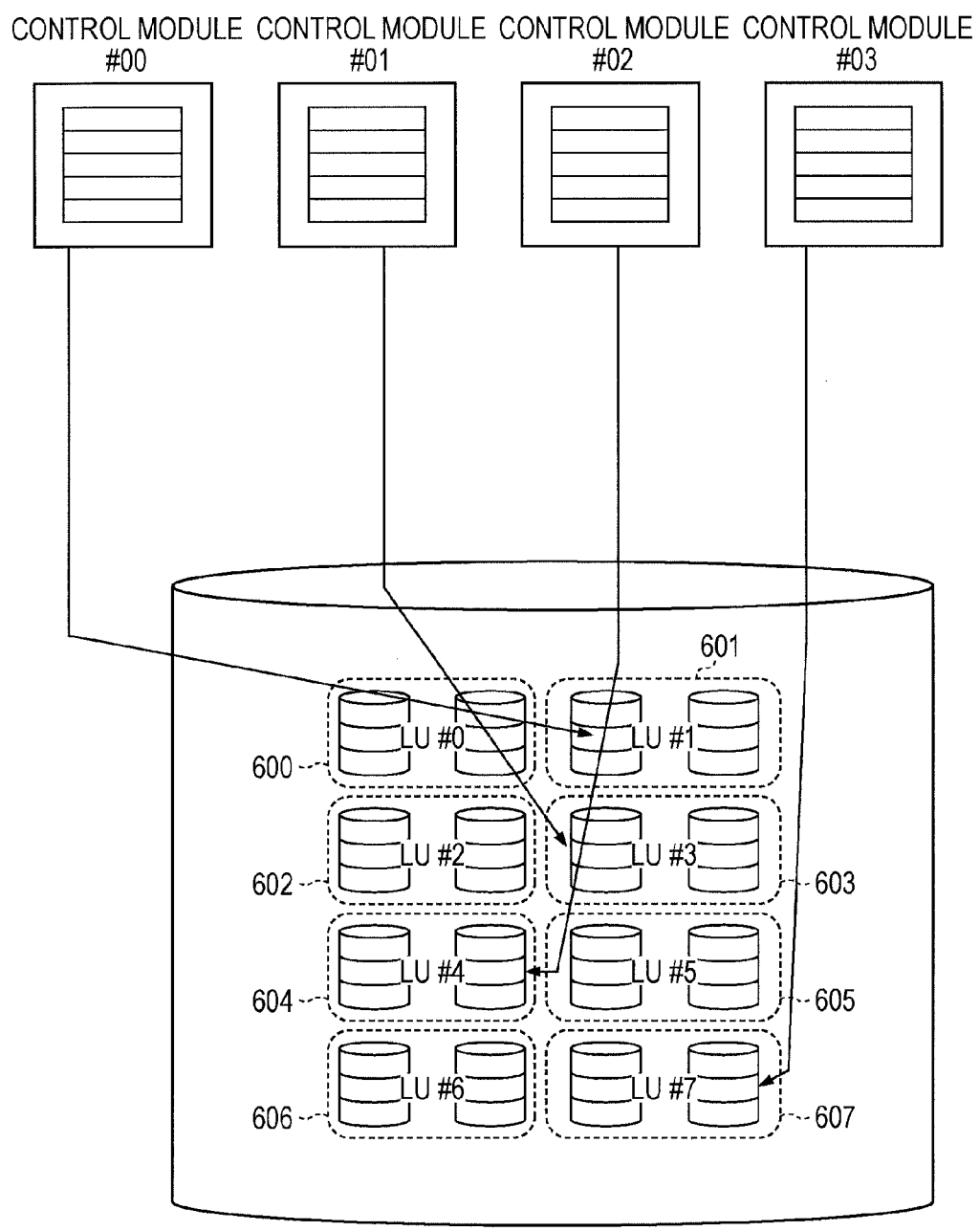
FIG. 9 is a diagram describing a relation between an evacuation buffer and a buffer set.

An example of this embodiment will be described below.

FIG. 1 is a diagram illustrating an overview of a configuration of a storage system 100 according to this embodiment.

The storage system 100 illustrated in FIG. 1 includes a RAID apparatus 110 and a RAID apparatus 120 connected to the RAID apparatus 110 via a network or a dedicated line 130 so that the RAID apparatuses can communicate with each other.

The RAID apparatus 110 is of a distributed cache memory type and includes control modules #00-#03 each having a memory serving as a cache memory, a disk device 117 constituted by a storage device, such as a magnetic disk device, and an evacuation buffer 118.

The control modules #00-#03 are connected to the disk device 117 and the evacuation buffer 118.

The control module #00 includes a central processing unit (CPU) 111a, a memory 112a, a channel adapter (CA) 113a, a remote adapter (RA) 114a, and device adapters (DAs) 115a and 116a.

The CPU 111a executes a predetermined program instruction to operate the control module #00, thereby realizing order-ensuring remote copy according to this embodiment.

The memory 112a is used as a cache memory, a recording buffer 201, and a buffer set information storage unit 202 to be described later.

The CA 113a is an interface controller against a host 150 serving as a host computer connected to the RAID apparatus 110. The RA 114a is an interface controller against another RAID apparatus connected via the network or dedicated line 130.

The DAs 115a and 116a are interface controllers against the disk device 117 and the evacuation buffer 118. In this embodiment, the DA 115a is connected to the disk device 117, whereas the DA 116a is connected to the evacuation buffer 118.

The other control modules #01-#03 included in the RAID apparatus 110 and control modules #00-#03 included in the RAID apparatus 120 also have a configuration similar to the control module #00 included in the RAID apparatus 110. However, the copy-destination RAID apparatus 120 does not have to include the evacuation buffer.

"First storage unit" can be realized with a partial area of the memory 112a, whereas "second storage unit" can be realized with a partial or entire area of the disk device 117 constituted by one or more magnetic disk devices.

Although FIG. 1 illustrates the RAID apparatuses 110 and 120 each including four control modules #00-#03, the configurations thereof are not limited to this example. The RAID apparatuses 110 and 120 are at least of the distributed cache memory type. Additionally, the numbers of CPUs, CAs, RAs, and DAs are not limited to the ones illustrated in FIG. 1.

In the embodiment described below, remote copy from the RAID apparatus 110 to the RAID apparatus 120 will be described. In this case, the RAID apparatus 110 is referred to as a "copy-source apparatus 110", whereas the RAID apparatus 120 is referred to as a "copy-destination apparatus 120".

FIG. 2 is a diagram illustrating an example of a specific configuration of a memory 200 included in a control module according to this embodiment, such as the memory 112a included in the control module #00 of the RAID apparatus 110 illustrated in FIG. 1.

Memories 112b, 112c, and 112d included in the control modules #01-#03 of the RAID apparatus 110 and memories 122a, 122b, 122c, and 122d included in the control modules #00-#03 of the RAID apparatus 120, respectively, may have a configuration similar to the one illustrated in FIG. 2.

The memory 200 illustrated in FIG. 2 includes the recording buffer 201 and the buffer set information storage unit 202. The memory 200 also includes a buffer management table storage unit 203, a buffer set management table storage unit 204, an evacuation buffer management table storage unit 205, and an unused buffer ID storage unit 206.

The recording buffer 201 includes a buffer 201a and a BIT storage unit 201b.

The buffer 201a temporarily stores data stored or to be stored in the disk device 117, such as write data to be described later. The buffer 201a according to this embodiment is divided into eight areas of a predetermined size. Each of the divided areas is assigned with unique identification information. Although the example of dividing the buffer 201a into eight areas is described in this embodiment, a configuration of the buffer 201a is not limited to the eight divided areas.

Hereinafter, each divided area is referred to as an "individual buffer", whereas the identification information assigned to the individual buffer is referred to as a "buffer ID". Data stored in an individual buffer indicated by a given buffer ID is referred to as "buffer data".

For example, numerals enclosed in parentheses "0000", "0001", "0002", . . . of "(0000)", "(0001)", "(0002)", . . . written in the buffer 201a of FIG. 2 indicate buffer IDs assigned for the individual buffers, respectively. Numerals with parentheses "(0000)", "(0001)", "(0002)", . . . indicate pieces of buffer data stored in the respective individual buffers indicated by the respective buffer IDs enclosed by the parentheses.

The BIT storage unit 201b stores BIT including a logical unit and a logical block address where buffer data stored in the individual buffer of the buffer 201a is loaded, a data size, and a copy session number.

Numerals "0000", "0001", "0002", . . . written in the BIT storage unit 201b indicate buffer IDs assigned to the respective individual buffers of the buffer 201a. For example, "0000" of the BIT storage unit 201b stores the BIT including an LU and an LBA where buffer data stored in an individual buffer having a buffer ID "0000" is loaded, a data size, and a copy session number.

The buffer set information storage unit 202 stores identification information indicating a combination of individual buffers to be used next in respective control modules of a given RAID apparatus. More specifically, the buffer set information storage unit 202 stores a buffer set ID to be described later.

Hereinafter, the combination of the individual buffers of the respective control modules of the given RAID apparatus is referred to as a "buffer set", whereas the identification information assigned to the buffer set is referred to as a "buffer set ID". Additionally, information on the buffer set is referred to as "buffer set information". Furthermore, buffer data stored in the buffer set is collectively referred to as "buffer set data".

In this embodiment, since eight individual buffers are included in the buffer 201a of each control module, eight buffer sets also exist. For ease of explanation, it is assumed that the buffer set ID is the same as the buffer ID of the individual buffer of a master control module, which will be described later.

The buffer set information also includes information for associating an individual buffer of a control module implemented in the copy-source apparatus 110 with an individual buffer of a control module implemented in the copy-destination apparatus 120 when remote copy is performed between the RAID apparatuses. Processing for including this association information in the buffer set information is referred to as "matching processing".

Hereinafter, the buffer ID of the individual buffer of the control module implemented in the copy-source apparatus 110 is referred to as a "copy-source ID". Similarly, the buffer ID of the individual buffer of the control module implemented in the copy-destination apparatus 120 is referred to as a "copy-destination ID".

For example, since the RAID apparatus 110 is of a distributed cache memory type, the RAID apparatus 110 stores data in individual buffers of respective control modules in a distributed manner. For example, the RAID apparatus 110 stores write data in the individual buffers having the buffer IDs "0000", "0100", "0200", "0300" in the example illustrated in FIG. 2.

In this case, the buffer set information storage unit 202 stores buffer set information indicating a buffer set of the individual buffers having the buffer IDs "0000", "0100", "0200", and "0300".

The buffer set information also includes information on combinations of the copy-source IDs and the copy-destination IDs, i.e., "0000" and "1000", "0100" and "1100", "0200" and "1200", and "0300" and "1300".

The buffer IDs "0000", "0100", "0200", and "0300" stored in the buffer set information storage unit 202 illustrated in FIG. 2 indicate the individual buffers included in the control modules #00, #01, #02, and #03 implemented in the copy-source apparatus 110, respectively.

Additionally, the buffer IDs "1000", "1100", "1200", and "1300" stored in the buffer set information storage unit 202 illustrated in FIG. 2 indicate the individual buffers included in the control modules #00, #01, #02, and #03 implemented in the copy-destination apparatus 120, respectively.

Remote copy according to this embodiment is performed in units of buffer sets. Copy-target data in units of buffer sets includes the BIT and the buffer data stored in the recording buffer 201 and the buffer set information stored in the buffer set information storage unit 202.

In this embodiment, the copy-target data in units of buffer sets is managed as one "generation". The buffer management table storage unit 203 stores a buffer management table 300 for use in management of the recording buffer 201. The buffer management table 300 will be described later.

The buffer set management table storage unit 204 stores a buffer set management table 400 for use in management of a use state of the buffer sets, an order-ensuring remote copy management table 410, an individual buffer management table 420, a date-based point table 430, and a day-based point table 440. The evacuation buffer management table storage unit 205 stores an overall evacuation buffer management table 500 for use in management of the evacuation buffer 118, LU management tables 510, evacuation buffer set management tables 520, and empty evacuation buffer management tables 530. These tables will be described later.

The unused buffer ID storage unit 206 stores buffer IDs of unused individual buffers included in the copy-destination apparatus 120. Hereinafter, the buffer ID of the unused individual buffer is referred to as an "unused buffer ID". For example, upon receiving a notification regarding an unused buffer ID from the copy-destination apparatus 120, the copy-source apparatus 110 stores the notified unused buffer ID in the unused buffer ID storage unit 206.

With the foregoing configuration, the copy-source apparatus 110 collectively performs, in units of buffer sets, processing for storing write data in the recording buffer 201 and processing for transferring the write data to the copy-destination apparatus 120 in remote copy according to this embodiment.

Similarly, the copy-destination apparatus 120 collectively performs, in units of buffer sets, processing for loading the write data transferred from the copy-source apparatus 110 in a disk device 127 in the remote copy according to this embodiment. As a result, remote copy ensuring the order is realized.

FIG. 3 is a diagram illustrating an example of a configuration of the buffer management table 300 according to this embodiment.

The buffer management table 300 includes a target buffer set ID, write back pointer information, stage pointer information, and a buffer threshold.

The target buffer set ID is information indicating an ID of a buffer set currently in use. The write back pointer information indicates a generation of a write-back target to be described later. The stage pointer information indicates a generation of the last staging, which will be described later. The buffer threshold is information used as a criterion for determining whether to execute write back processing, which will be described later.

FIG. 4 is a diagram illustrating an example of a configuration of the buffer set management table 400 according to this embodiment.

The buffer set management table 400 includes, for each buffer set ID, a use purpose, a target generation, a control module number for the buffer set, a buffer busy status, and a number of stored data.

The use purpose of the buffer set management table 400 is set in advance for each buffer set indicated by the buffer set ID. For example, "staging" is set when a buffer set is used for staging, whereas "write back" is set when a buffer set is used for writing back. "Storage" is set when copy data of write data is simply stored, whereas "transfer" is set when the stored copy data is transferred to the copy-destination apparatus 120. The target generation indicates a generation subjected to processing set for the use purpose. The number of stored data indicates the number of pieces of data stored in the buffer set. When the maximum size for one generation is 8 Mbytes (MB) and each storage size is 8 Kbytes (KB) as illustrated in FIG. 5, up to 1024 pieces of data can be stored. The copy-source apparatus 110 updates the target generation and the number of stored data every time the apparatus 110 stores the write data in the buffer set, for example.

The order-ensuring remote copy management table 410 is used to determine whether the order-ensuring remote copy can be executed. The order-ensuring remote copy management table 410 stores, as illustrated in FIG. 5, time for switching the buffer (seconds (S)), the maximum buffer set size for one generation (MB), halt-wait-state flag information (YES is written when the halt wait state occurs, whereas NO is written when the halt wait state does not occur), and a storage size (KB).

The date-based point table 430 and the day-based point table 440 store point information for each date and each day of the week, respectively. FIGS. 6 and 7 illustrate examples of these tables 430 and 440, respectively. Although time information is not included in FIGS. 6 and 7, these tables are prepared hourly and information is stored in the tables for the corresponding time of the corresponding date or day.

FIG. 8 is a diagram illustrating the overall evacuation buffer management table 500.

The overall evacuation buffer management table 500 stores the number of logical units (LUs) included in the evacuation buffer 118, the number of control modules, the number of buffers in the evacuation buffer 118, and the maximum number of buffer sets in the evacuation buffer 118. The overall evacuation buffer management table 500 also stores a unit size of the evacuation buffer (MB), a write back evacuation buffer set number, and a staging evacuation buffer set number.

The logical units LUs will now be described more specifically. FIG. 9 is a diagram illustrating an example of a configuration of the evacuation buffer according to this embodiment.

Eight RAID groups 600-607 including logical units LU#0-LU#7, respectively, are used as the evacuation buffer 118 as illustrated in FIG. 9.

Information on each of the logical units LU#0-LU#7 is stored as an LU management table 510 in the evacuation buffer management table storage unit 205. FIG. 10 illustrates the LU management table 510. Although FIG. 10 illustrates the LU management tables 510 for logical units having LU IDs 0 and 1 (corresponding to the logical units LU#0 and LU#1, respectively), the LU management tables 510 for the other logical units LU#2-LU#7 are also stored in the evacuation buffer management table storage unit 205.

This management information is stored in the evacuation buffer set management table storage unit 205 as the evacuation buffer set management table 520. FIG. 11 illustrates an example of the evacuation buffer set management table 520. As illustrated, the evacuation buffer set management table 520 stores, for each evacuation buffer set, a corresponding control module number, a corresponding logical unit number, an evacuation buffer offset, and the number of evacuation buffers. Since the number of buffer sets is 395008 as illustrated in FIG. 8, as many evacuation buffer set management tables 520 as the number of the buffer sets are stored in the evacuation buffer management table storage unit 205.

For example, referring to the management table 520 with the evacuation buffer set No. 1 illustrated in FIG. 11, the control module Nos. #00, #01, and #02 correspond to the LU Nos. 1, 3, and 4, respectively. Although illustration is omitted for convenience of explanation, it is assumed that the control module #03 corresponds to the LU No. 7. In this case, each control module is assigned to have the above-described correspondence illustrated in FIG. 11 for the buffer set having the evacuation buffer set No. 1. This correspondence can be set for each evacuation buffer set management table 520. For example, referring to the management table 520 with the evacuation buffer set No. 0 illustrated in FIG. 11, the control modules #00, #01, and #02 correspond to the LU Nos 0, 1, and 2, respectively. That is, the correspondence differs from that for the above-described management table 520 for the evacuation buffer set No. 1. As many buffers as the control modules are grouped as a buffer set. The overall evacuation buffer management table 500 stores a value (395008) at the maximum number of buffer sets, which is obtained by dividing the number of evacuation buffers (1580032) by the number of control modules (4).

As described above, the empty evacuation buffer management table 530 is stored, for each logical unit, in the evacuation buffer management table storage unit 205. As illustrated in FIG. 12, the empty evacuation buffer management table 530 stores, as a bitmap, information indicating whether the corresponding evacuation buffer set of each logical unit is in use. In this embodiment, a value "1" indicates the in-use state, whereas a value "0" indicates the empty state.

If the number of buffer sets in use for transfer or data load wait in the copy-destination apparatus 120 exceeds the buffer threshold, the copy-source apparatus 110 evacuates the data to be stored in the exceeding buffer sets in the evacuation buffer 118.

Once the buffer set in use for the transfer or the data load wait in the copy-destination apparatus 120 is freed, the copy-source apparatus 110 stores the data evacuated in the evacuation buffer 118 in the freed buffer set.

Hereinafter, evacuating data stored in a buffer set to the evacuation buffer 118 is referred to as "writing back", whereas storing data evacuated in the evacuation buffer 118 in a buffer set is referred to as "staging".

The number of buffer sets in use for staging, transfer, or load processing wait in the copy-destination apparatus 120 is referred to as "the number of in-use buffer sets". The buffer sets in use for the transfer include buffer sets currently subjected to staging.

For example, "a usage rate of buffer sets" may be used instead of "the number of in-use buffer sets". The usage rate of buffer sets can be determined from a calculation "the number of in-use buffer sets"/"the number of buffer sets".

The copy-source apparatus 110 performs optimization by increasing and decreasing the buffer threshold depending of processing load involving write I/O processing. The processing load involving the write I/O processing can be determined based on, for example, the number of unprocessed write I/O requests received from the host 150 but waiting to be processed.

Instead of the processing load involving write I/O processing, the buffer threshold may be optimized using information including at least one of write-back/staging performance, an amount of data update such as write I/O instructions, a use state of buffer sets, and line speed between the copy-source apparatus 110 and the copy-destination apparatus 120, for example.

Figure 13:
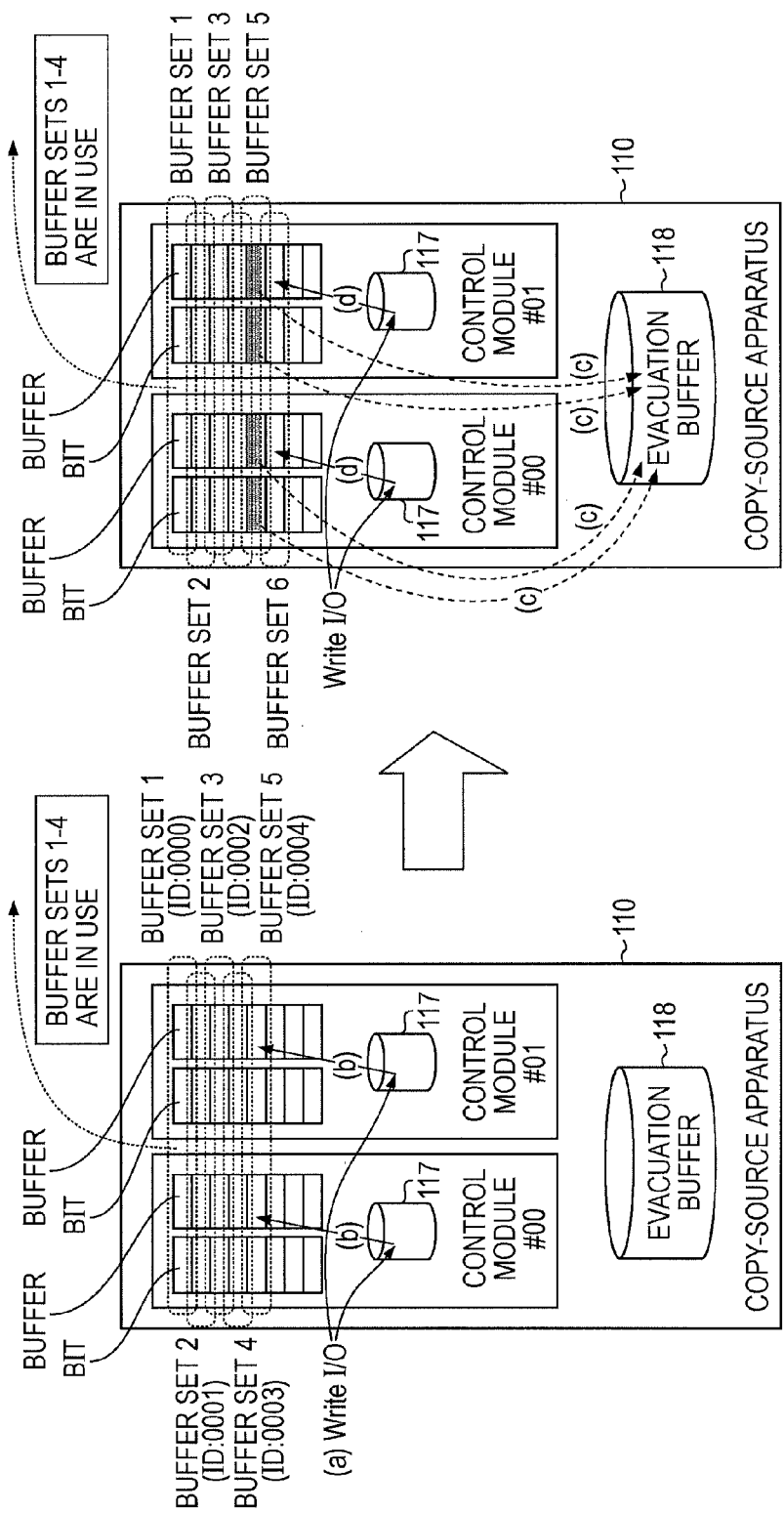
FIG. 13 is a diagram describing buffer evacuation processing.
Figure 14:
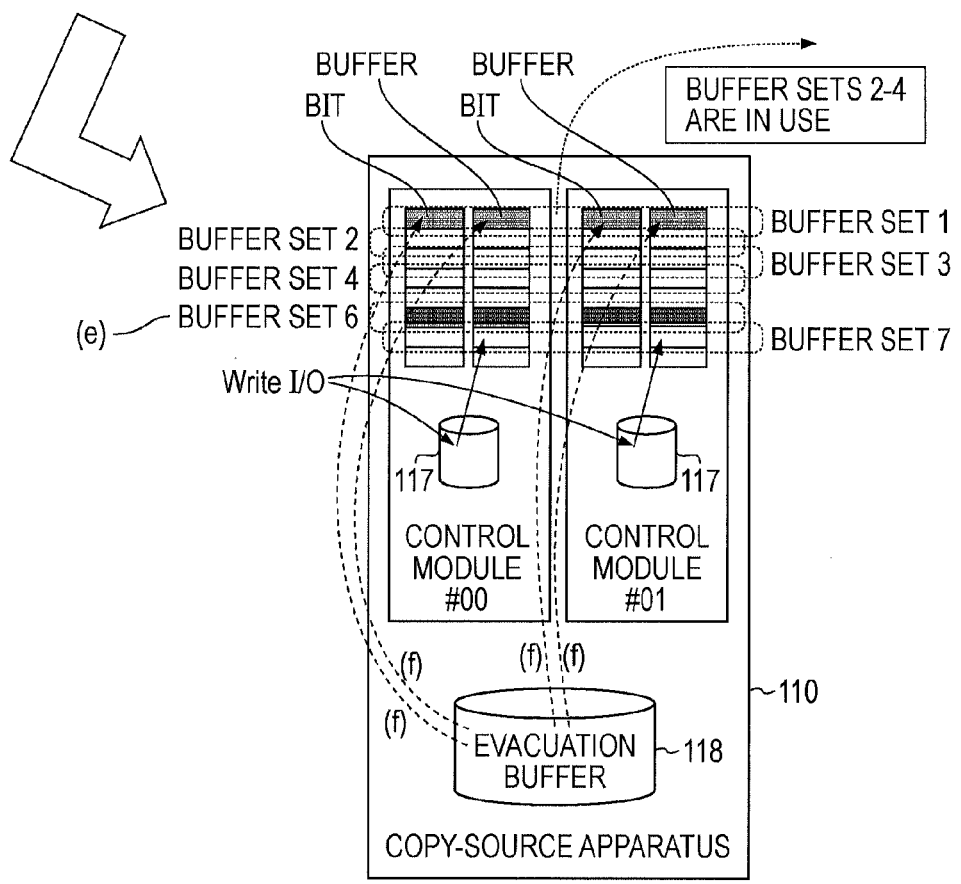
FIG. 14 is a diagram describing buffer evacuation processing.

FIGS. 13 and 14 are diagrams describing buffer evacuation processing according to this embodiment.

For ease of understanding, FIGS. 13 and 14 illustrate a simplified configuration of the copy-source apparatus 110. For example, FIGS. 13 and 14 illustrate control modules #00 and #01 however the configuration of the copy-source apparatus 110 is not limited to the one illustrated in FIGS. 13 and 14. Additionally, the disk device 117 is illustrated for each control module for ease of explanation, however, the configuration of the copy-source apparatus 110 is not limited to the one illustrated in FIGS. 13 and 14.

FIG. 13 is a diagram describing buffer evacuation processing when a write I/O instruction is received while buffer sets 1-4 are in use for transfer or load processing wait in the copy-destination apparatus 120. Hereinafter, it is assumed that pieces of buffer set data stored in the buffer sets 1-4 are of generations 1, 2, 3, and 4, respectively. Each control module of the copy-source apparatus 110 is collectively referred to as a "control module".

Upon receiving a write I/O instruction, the control module stores write data in the disk device 117 thereof (see (a)) and stores copy of the write data in a buffer set 5 (see (b)). The data stored in the buffer set 5 is of a generation 5.

For example, if the number of in-use buffer sets exceeds the buffer threshold, the control module writes back the buffer set data of the generation 5 stored in the buffer set 5, which is to be transferred to the copy-destination apparatus 120 next, in the evacuation buffer 118 (see (c)). The control module then optimizes the buffer threshold.

After writing back the buffer set data in the evacuation buffer 118, the control module switches the storage destination of data, such as new write data, to a buffer set 6 from the buffer set 5.

Upon receiving a new write I/O instruction, the control module stores write data in the disk device 117 thereof and stores copy of the write data in the buffer set 6 (see (d)). The buffer set data stored in the buffer set 6 is of a generation 6.

Since the generation older than the generation 6 of the buffer set 6, e.g., the generation 5 in FIG. 9, is written back in the evacuation buffer 118, the control module writes back the buffer set data stored in the buffer set 6 to the evacuation buffer 118 (see (e)).

Once the in-use buffer set 1 is freed, the control module reads out the buffer set data of the generation 5 stored in the evacuation buffer 118 and stores the buffer set data in the buffer set 1 (see (f)). In this embodiment, "freeing" indicates setting a buffer in an unused state.

After transfer and loading processing of the buffer set data of the buffer set 1 in the copy-destination apparatus 120 completes, the control module optimizes the buffer threshold.

Figure 15:
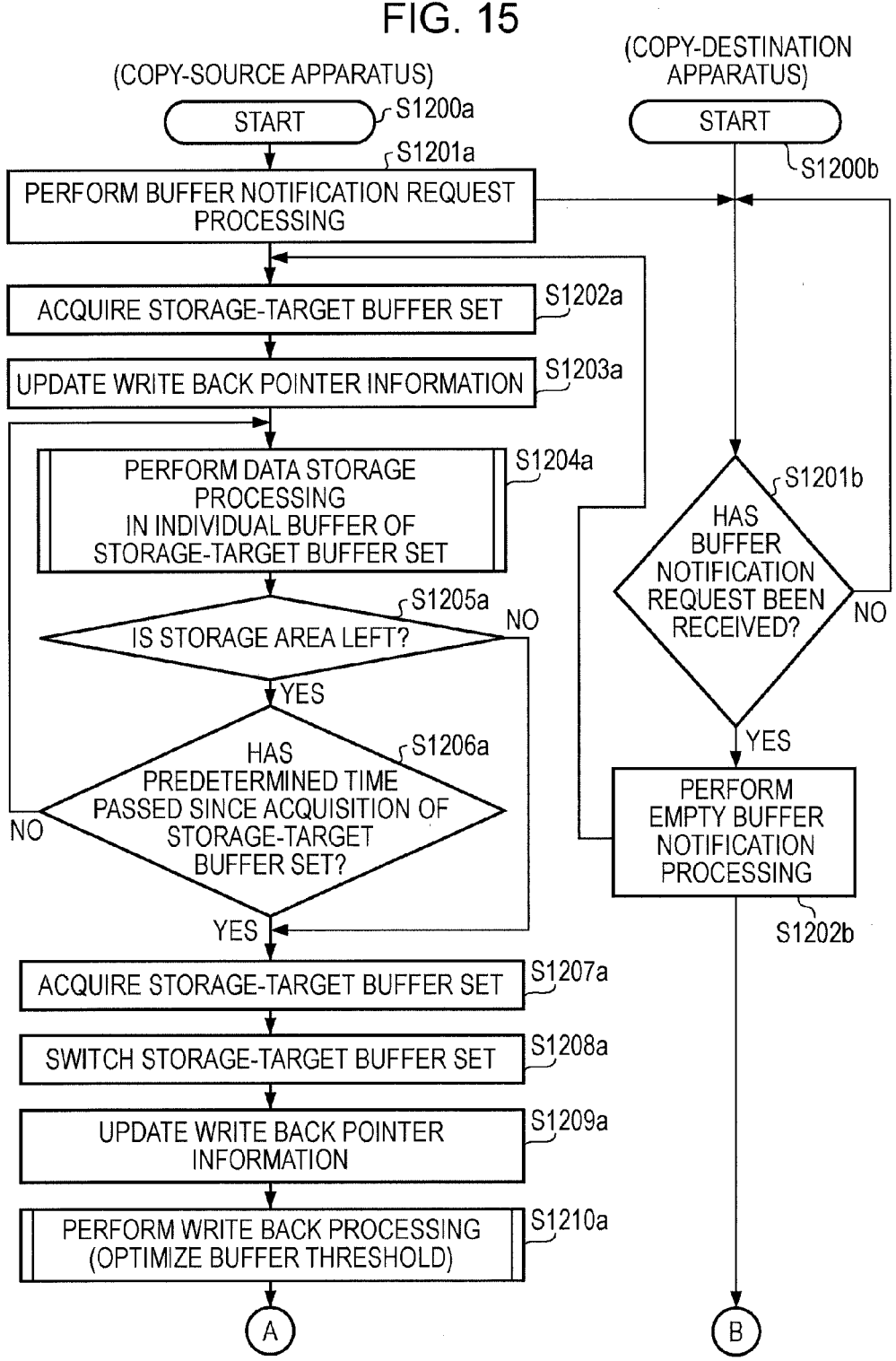
FIG. 15 is a flowchart illustrating an overview of remote copy.
Figure 16:
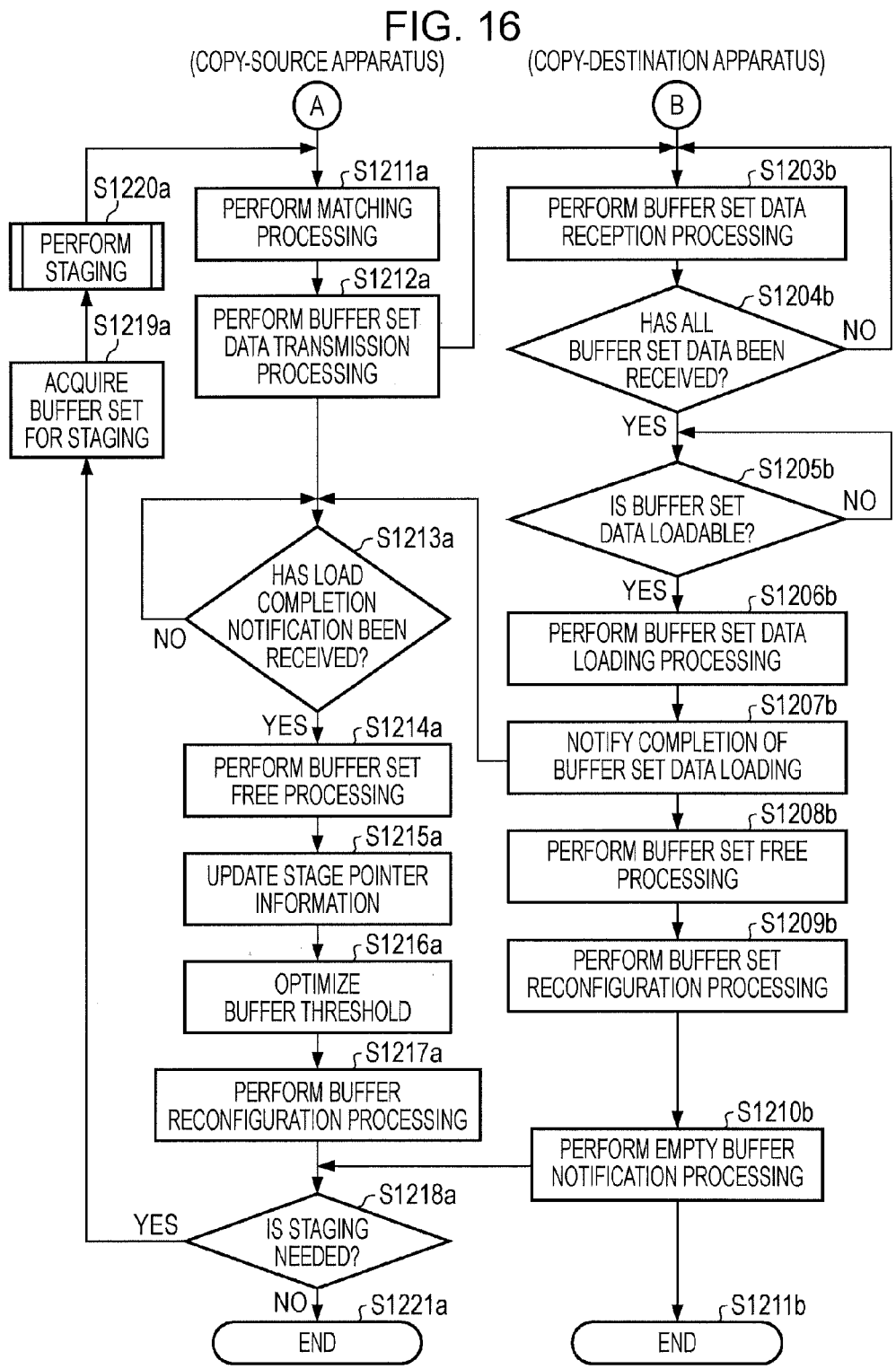
FIG. 16 is a flowchart illustrating an overview of remote copy.

FIGS. 15 and 16 are flowcharts illustrating an overview of remote copy according to this embodiment. Hereinafter, the overview of the remote copy according to this embodiment will be described based on FIGS. 15 and 16. The copy-source apparatus 110 performs buffer initial configuration processing after being activated. For example, the copy-source apparatus 110 allocates areas for the configuration illustrated in FIG. 2 in the memory 200 included in each control module in accordance with configuration information set in advance. The copy-source apparatus 110 then performs initialization of each area.

The copy-source apparatus 110 assigns, for each control module, a volume group for the recording buffer. Specific processing will be described with reference to FIGS. 17 and 18.

The copy-source apparatus 110 generates buffer sets and performs initial generation processing on the generated buffer sets. For example, the copy-source apparatus 110 generates buffer sets by combining individual buffers of the respective control modules. The copy-source apparatus 110 then stores information on the generated buffer sets in the buffer set information storage unit 202 as buffer set information.

The copy-destination apparatus 120 also performs the foregoing processing.

The copy-source apparatus 110 further initializes the buffer management table 300, the buffer set management table 400, and the evacuation buffer management table 500. The copy-source apparatus 110 also initializes the buffer threshold. Specific processing will be described with reference to FIG. 19.

After the foregoing processing, preparation for remote copy between the copy-source apparatus 110 and the copy-destination apparatus 120 completes. After the preparation for receiving a write I/O instruction from the host 150 completes, the remote copy starts (STEPs S1200a and S1200b).

In STEP S1201a, the copy-source apparatus 110 issues an unused buffer notify request command to the copy-destination apparatus 120 to request the copy-destination apparatus 120 to send a notification on unused individual buffers.

On the other hand, the process proceeds to STEP S1201b in the copy-destination apparatus 120. The copy-destination apparatus 120 monitors the unused buffer notify request command until it receives the command from the copy-source apparatus 110 (NO in STEP S1201b).

After the copy-destination apparatus 120 detects in STEP S1201b the unused buffer notify request command sent from the copy-source apparatus 110 (YES in STEP S1201*b*), the process proceeds to STEP S1202*b*.

In STEP S1202*b*, the copy-destination apparatus 120 retrieves unused individual buffers whose areas have been already freed. After detecting the unused individual buffers of already freed areas, the copy-destination apparatus 120 notifies the copy-source apparatus 110 of the buffer IDs of the detected individual buffers as the unused buffer IDs.

Upon receiving the unused buffer IDs from the copy-destination apparatus 120, the copy-source apparatus 110 stores the notified unused buffer IDs in the unused buffer ID storage unit 206.

In STEP S1202*a*, the copy-source apparatus 110 acquires a buffer set for storing the write data. The buffer set for storing the write data is referred to as a "storage-target buffer set".

For example, the copy-source apparatus 110 acquires an unused buffer set ID with reference to the buffer set management table 400. The copy-source apparatus 110 then sets the acquired buffer set ID at the target buffer set ID of the buffer management table 300.

The copy-source apparatus 110 performs following processing on the "storage-target buffer set", i.e., the buffer set indicated by the buffer set ID set at the target buffer set ID of the buffer management table 300.

In STEP S1202*a*, the copy-source apparatus 110 does not perform matching processing. The copy-source apparatus 110 performs the matching processing in STEP S1211*a* to be described later, that is, before performing transmission processing of the buffer set data.

In STEP S1203*a*, the copy-source apparatus 110 increments the generation by 1 to update the generation set in the write back pointer information of the buffer management table 300.

In STEP S1204*a*, the copy-source apparatus 110 performs processing for storing the write data in the individual buffers of the storage-target buffer set.

For example, suppose that the copy-source apparatus 110 receives a write I/O instruction from the host 150. The copy-source apparatus 110 stores the write data received with the write I/O instruction in the storage-target buffer set indicated by the currently used target buffer set ID of the buffer management table 300, i.e., individual buffers of the respective control modules, in a distributed manner. The processing for storing the write data in the individual buffers in STEP 1204*a* will be described in detail later.

In STEP S1205*a*, the copy-source apparatus 110 determines whether an area for storing data is left in the storage-target buffer set. If the copy-source apparatus 110 determines that no storage area is left (NO in STEP S1205*a*), the process proceeds to STEP S1207*a*.

If the copy-source apparatus 110 determines in STEP S1205*a* that the storage area is left (YES in STEP S1205*a*), the process proceeds to STEP S1206*a*. In this case, the copy-source apparatus 110 determines whether predetermined time has passed since acquisition of the storage-target buffer set (STEP S1206*a*).

If the copy-source apparatus 110 determines that the predetermined time has not passed (NO in STEP S1206*a*), the process returns to STEP S1204*a*. If the copy-source apparatus 110 determines that the predetermined time has passed (YES in STEP S1206*a*), the process proceeds to STEP S1207*a*.

In STEP S1207*a*, the copy-source apparatus 110 performs the processing similar to that of STEP S1202*a* to newly acquire a storage-target buffer set. In STEP S1208*a*, the copy-source apparatus 110 then switches the storage-target buffer set to the one newly acquired in STEP S1207*a*.

The storage target buffer set used before switching is referred to as a "write-back-target buffer set" in STEP S1210*a* and as a "transfer-target buffer set" in STEP S1212*a* and thereafter.

In STEP S1209*a*, the copy-source apparatus 110 performs processing similar to that of STEP S1203 to update the write back pointer information.

In STEP S1210*a*, the copy-source apparatus 110 performs write back processing. The copy-source apparatus 110 then optimizes the buffer threshold. The process then proceeds to STEP S1211*a* in the copy-source apparatus 110.

In STEP S1211*a*, the copy-source apparatus 110 performs the matching processing. For example, the copy-source apparatus 110 acquires the unused buffer ID from the unused buffer ID storage unit 206. The copy-source apparatus 110 assigns the acquired unused buffer ID to the copy-destination ID of the transfer-target buffer set to associate the copy-source ID and the copy-destination ID of the transfer-target buffer set.

In STEP S1212*a*, the copy-source apparatus 110 transmits the buffer set data stored in the transfer-target buffer set to the copy-destination apparatus 120. The buffer set data includes the buffer data stored in the buffer 201*a*, the BIT stored in the BIT storage unit 201*b*, and buffer set information stored in the buffer set information storage unit 202 of each control module.

After the copy-destination apparatus 120 receives the buffer set data from the copy-source apparatus 110, the process proceeds to STEP S1203*b*.

In STEP S1203*b*, the copy-source apparatus 120 performs processing for receiving the buffer set data. For example, the copy-destination apparatus 120 stores the buffer data, the BIT, and the buffer set information of the received buffer set data in the buffer 201*a*, the BIT storage unit 201*b*, and the buffer set information storage unit 202, respectively.

In STEP S1204*b*, the copy-destination apparatus 120 determines whether all buffer set data has been received. If the copy-destination apparatus 120 determines that the all buffer set data has not been received (NO in STEP S1204*b*), the process returns to STEP S1203*b* and the copy-destination apparatus 120 repeats the processing of STEPs S1203*b* and S1204*b*.

If the copy-destination apparatus 120 determines in STEP S1204*b* that the all buffer set data has been received (YES in STEP S1204*b*), the process proceeds to STEP S1205*b*.

In STEP S1205*b*, the copy-destination apparatus 120 determines whether disk device 127 of the storage device thereof can load the buffer set data acquired in STEP S1203*b*. If the copy-destination apparatus 120 determines that the disk device 127 can load the buffer set data (YES in STEP S1205*b*), the process proceeds to STEP S1206*b*.

In STEP S1206*b*, the copy-destination apparatus 120 loads the buffer set data acquired in STEP S1203*b* in the disk device 127 thereof. After finishing loading the data, the process proceeds to STEP S1207*b* and the copy-destination apparatus 120 notifies the copy-source apparatus 110 of the completion of loading of the buffer set data. Hereinafter, this notification is referred to as a "buffer set data loading completion notification".

After finishing loading the buffer set data in the disk device 127, the copy-destination apparatus 120 performs processing for freeing the buffer set in STEP S1208*b*. For example, the copy-destination apparatus 120 sets the buffer set whose buffer set data has been loaded in the disk device 127 in the unused state.

In STEP S1209*b*, the copy-destination apparatus 120 newly allocates areas for the buffer set information storage unit 202 and the recording buffer 201 in the freed areas to construct the configuration illustrated in FIG. 2, for example.

After finishing the foregoing processing, the process proceeds to STEP S1210b and the copy-destination apparatus 120 notifies the copy-source apparatus 110 of unused buffer IDs of the buffers newly made available by the processing of STEPs S1208b and S1209b (STEP S1210b). Upon being notified of the unused buffer IDs, the copy-source apparatus 110 stores the notified unused buffer IDs in the unused buffer ID storage unit 206.

In STEP S1213a, the copy-source apparatus 110 determines whether it has received the buffer set data loading completion notification from the copy-destination apparatus 120. If the copy-source apparatus 110 has not received the buffer set data loading completion notification (NO in STEP S1213a), the copy-source apparatus 110 repeats the processing of STEP S1213a. If the copy-source apparatus 110 has received the buffer set data loading completion notification from the copy-destination apparatus 120 (YES in STEP S1213a), the process proceeds to STEP S1214a.

In STEP S1214a, just like in STEP S1208b, the copy-source apparatus 110 performs the buffer set free processing on the transfer target buffer set having undergone the buffer set data transmission processing of STEP S1212a. More specifically, the copy-source apparatus 110 sets the transfer target buffer set whose data has been transferred in the unused state with reference to the buffer set management table 400.

In STEP S1215a, the copy-source apparatus 110 increments the generation by 1 to update the generation set in the stage pointer information with reference to the buffer management table 300. In STEP S1216a, the copy-source apparatus 110 optimizes the buffer threshold. In STEP S1217a, the copy-source apparatus 110 performs buffer reconstruction processing by initializing an area of the unused buffer set.

In STEP S1218a, the copy-source apparatus 110 determines whether staging is needed. For example, the copy-source apparatus 110 determines whether the staging is needed based on whether the evacuation buffer 118 stores the written-back generation.

More specifically, the copy-source apparatus 110 can determine presence or absence of the generation written back in the evacuation buffer 118 through processing (a)-(d) described below.

The copy-source apparatus 110 acquires the write back pointer information and the stage pointer information with reference to the buffer management table 300 (a).

The copy-source apparatus 110 traces the generation in the ascending order from the generation calculated by adding 1 to the stage pointer information with reference to the buffer set management table 400 to retrieve a generation missing in the buffer set management table 400 (b).

For example, suppose that the generation 2 is set as the stage pointer information in the buffer management table 300 illustrated in FIG. 3. The copy-source apparatus 110 traces the generation from the generation 3, which is obtained by adding 1 to the generation 2, to the generations 4, 5, and so on in the ascending order with reference to the buffer set management table 400 illustrated in FIG. 4. In this way, the copy-source apparatus 110 detects the generation 7 missing in the buffer set management table 400.

The copy-source apparatus 110 then traces the generation in the descending order from the one indicated by the write back pointer information with reference to the buffer set management table 400 to retrieve a generation missing in the buffer set management table 400 (c).

For example, suppose that the generation 15 is set as the write back pointer information in the buffer management table 300 illustrated in FIG. 3. The copy-source apparatus 110 traces the generation from the generation 15 to the generations 14, 13, and so on in the descending order with reference to the buffer set management table 400 illustrated in FIG. 4. In this way, the copy-source apparatus 110 detects the generation 12 missing in the buffer set management table 400.

The copy-source apparatus 110 determines that generations 7-12 detected in the foregoing processing are written back in the evacuation buffer 118 (d).

If the copy-source apparatus 110 determines in STEP S1218a that the evacuation buffer 118 stores the written-back generation (YES in STEP S1218a), the process proceeds to STEP S1219a. If the copy-source apparatus 110 determines that the evacuation buffer 118 stores no written-back generation (NO in STEP S1218a), the process proceeds to STEP S1221a.

In STEP S1219a, the copy-source apparatus 110 acquires a buffer set for use in staging, i.e., a staging buffer set.

For example, the copy-source apparatus 110 acquires, as a "staging target buffer set ID", an unused buffer set ID with reference to the buffer set management table 400.

With reference to the buffer set management table 400, the copy-source apparatus 110 also sets the target generation of the buffer set ID matching the staging target buffer set ID to the staging-target generation, which will be described later.

The copy-source apparatus 110 additionally sets the use purpose of the buffer set ID matching the staging target buffer set ID to "staging" with reference to the buffer set management table 400.

In STEP S1220a, the copy-source apparatus 110 executes staging. After the copy-source apparatus 110 completes the staging, the process returns to STEP S1211a.

After finishing the foregoing processing, the copy-source apparatus 110 terminates the remote copy or continues the remote copy as the process returns to STEP S1204a. Upon newly receiving a write I/O instruction from the host 150, the copy-source apparatus 110 continues the remote copy from STEP S1204a.

After finishing the foregoing processing, the copy-destination apparatus 120 terminates the remote copy or continues the remote copy as the process returns to STEP S1203b.

The following processing of the remote copy according to this embodiment will now be described more specifically.

(1) Processing for creating an area of the evacuation buffer 118.

(2) Processing for generating each table of the evacuation buffer set management table storage unit 205.

(3) Processing for initializing the buffer threshold.

(4) Processing for switching the buffer set.

(5) Processing for updating the write back pointer information and the stage pointer information.

(6) Processing for write back.

(7) Processing for scheduling relocation.

(8) Processing for staging.

(9) Processing for optimizing the buffer threshold.

The processing (1)-(9) will be sequentially described below.

(1) Processing for Creating Area of Evacuation Buffer

Figure 17:
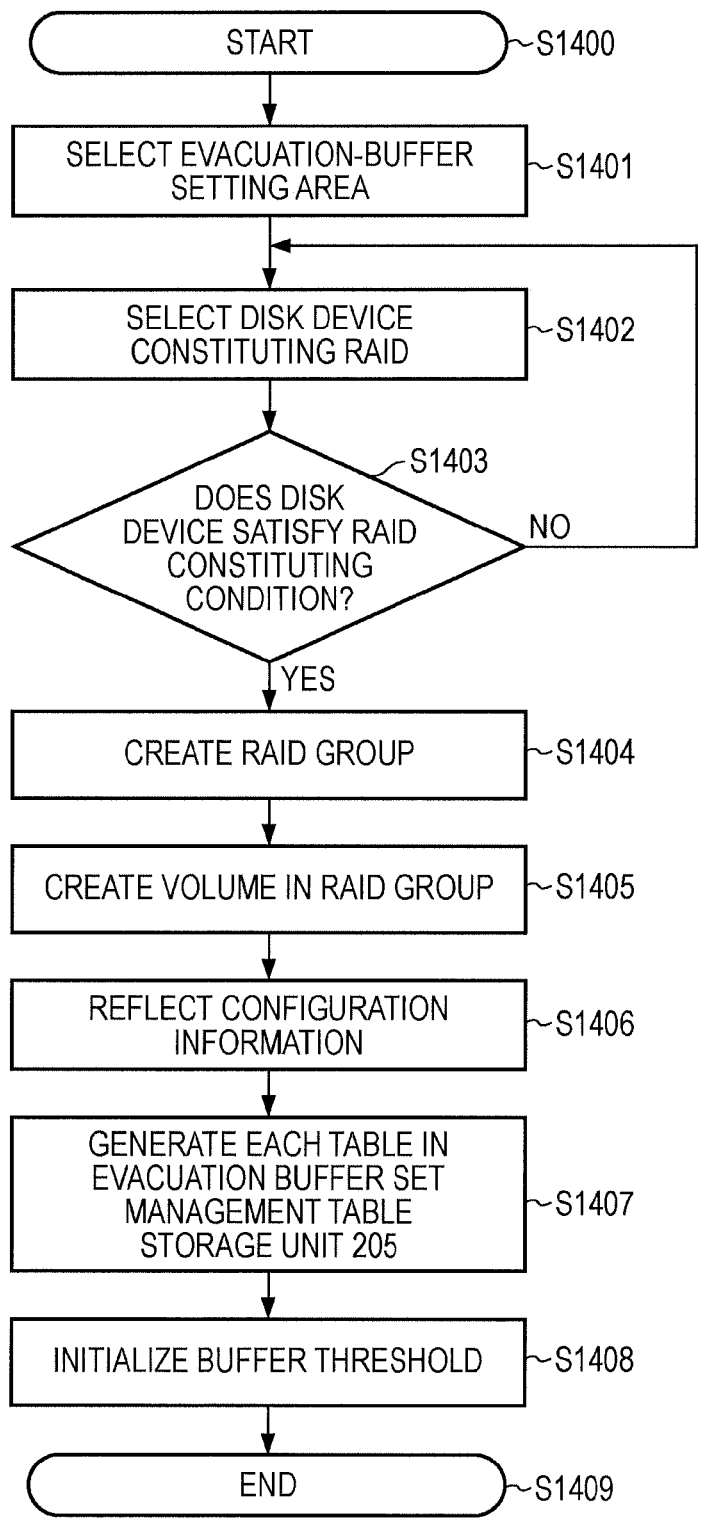
FIG. 17 is a flowchart illustrating processing for creating an evacuation buffer area.

FIG. 17 is a flowchart illustrating the processing for creating the area of the evacuation buffer 118 according to this embodiment. The processing illustrated in FIG. 17 can be executed, for example, during maintenance or booting of the copy-source apparatus 110.

In STEP S1401, the copy-source apparatus 110 selects an area for the evacuation buffer 118 from the buffer 201a of the recording buffer 201 in accordance with a user input. The process then proceeds to STEP S1402 and the copy-source apparatus 110 selects a disk device for constituting a RAID in accordance with a user input.

In STEP S1403, the copy-source apparatus 110 determines whether the disk device selected in STEP S1402 satisfies a condition for constituting the RAID. If the condition is not satisfied (NO in STEP S1403), the copy-source apparatus 110 displays a message prompting the user to specify another disk device on a display device, for example. The process then returns to STEP S1402.

If the condition is satisfied in STEP S1403 (YES in STEP S1403), the process proceeds to STEP S1404 in the copy-source apparatus 110.

In STEP S1404, the copy-source apparatus 110 creates a RAID group constituted by the disk device selected in STEP S1402 and reflects information on the RAID group in configuration information, which includes a configuration of the copy-source apparatus 110.

In STEP S1405, the copy-source apparatus 110 creates a plurality of volumes in the RAID group created in STEP S1404. The process then proceeds to STEP S1406 and the copy-source apparatus 110 reflects a configuration of the logical units created in STEP S1405 in the configuration information.

Figure 18:
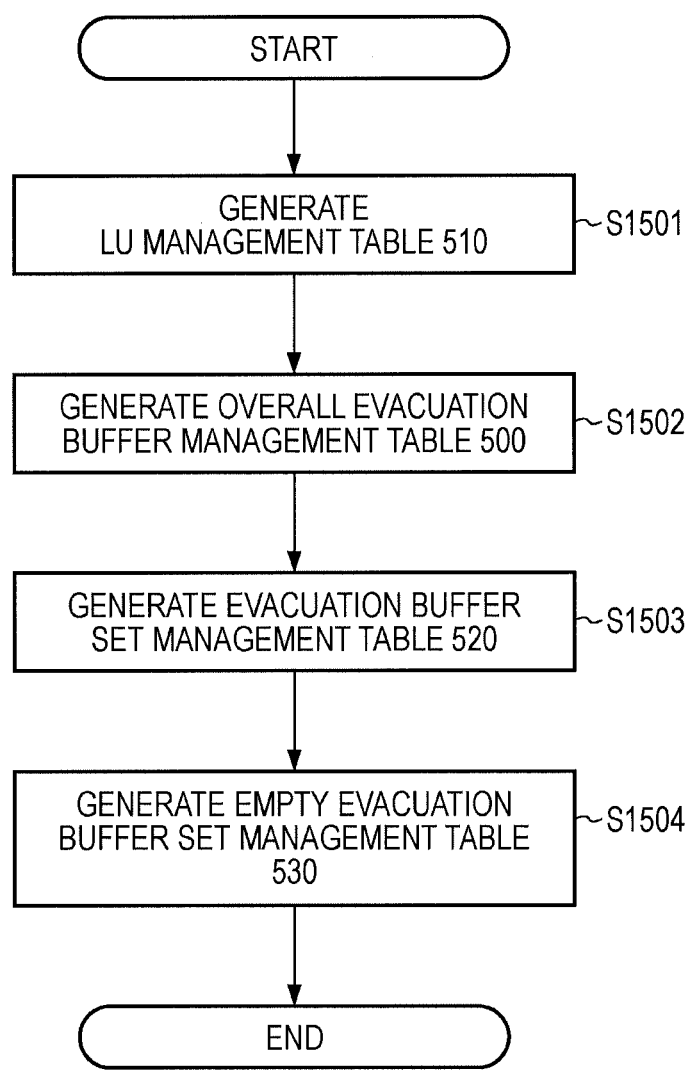
FIG. 18 is a flowchart illustrating processing for generating an evacuation buffer-set management table.

In STEP S1407, the copy-source apparatus 110 performs processing illustrated in FIG. 18 to generate each table of the evacuation buffer set management table storage unit 205.

In STEP S1408, the copy-source apparatus 110 initializes the buffer threshold. The process then proceeds to STEP S1409 and the copy-source apparatus 110 terminates the processing for creating the area of the evacuation buffer 118.

(2) Processing for Generating Each Table of Evacuation Buffer Set Management Table Storage Unit 205

The processing in STEP S1407 of the above-described processing illustrated in FIG. 17 will be described in detail using a flowchart illustrated in FIG. 18.

The copy-source apparatus 110 generates the LU management table 510 based on the capacity of the evacuation buffer set (1 MB in this embodiment) and the number of LUs set by the user. As described above, since this table is generated for each logical unit, as many LU management tables 510 as the number of logical units (eight in this embodiment) are generated.

More specifically, a value obtained by dividing the size of the logical unit by the size of the evacuation buffer is stored as the maximum number of evacuation buffers (STEP S1501).

Since the evacuation buffer set is not used during booting and management, the number of in-use buffers is equal to 0 and the number of empty evacuation buffers is equal to the maximum number of evacuation buffers. The evacuation buffer size and the LU number are also set. Additionally, a value of the evacuation buffer performance is determined based on transfer speed in write back processing performed in the logical unit.

The copy-source apparatus 110 then generates the overall evacuation buffer management table 500 (STEP S1502). The overall evacuation buffer management table 500 is generated using the foregoing processing or various values set up to this point. The number of logical units LU is set to 8, i.e., LU#0-LU#7, whereas the number of control modules is set to 4. The copy-source apparatus 110 sums up the maximum number of evacuation buffer sets stored in each LU management table to determine the number of evacuation buffers. Additionally, the copy-source apparatus 110 divides the number of evacuation buffers by the number of control modules to determine the maximum number of evacuation buffer sets. As described above, since the buffer sets are used by the control modules #00-#03, the number of buffer sets is determined from "(the number of buffers)÷(the number of control modules)".

Furthermore, the copy-source apparatus 110 stores the unit size of the evacuation buffer (1 MB as described before) and initializes the write back buffer set number and the staging buffer set number (0 is set for each buffer set number in this embodiment).

The copy-source apparatus 110 also generates the evacuation buffer set management table 520 based on the information acquired in the foregoing manner (STEP S1503). As many evacuation buffer set management tables 520 as the number of evacuation buffer sets are generated.

More specifically, since the number of evacuation buffer sets calculated at the time of generation of the general evacuation buffer table is equal to 197504, 197504 evacuation buffer set management tables 520 are generated in this embodiment. The copy-source apparatus 110 stores, for each control module, information indicating a evacuation buffer offset of the logical unit to be used, i.e., the logical unit number (LU No.), the evacuation buffer offset in the logical unit, and the number of evacuation buffers, in the evacuation buffer set management table. Naturally, the copy-source apparatus 110 performs this setting while performing exclusive control so that a storage area indicated by this address does not overlap other buffers.

The copy-source apparatus 110 then generates the empty evacuation buffer management table 530 for each logical unit (STEP S1504). As illustrated in FIG. 12, the empty evacuation buffer management table 530 stores, as a bitmap, information indicating whether each evacuation buffer set is in use. As described above, the copy-source apparatus 110 stores "1" for the in-use state and "0" for the empty state in this embodiment. Since the entire buffer sets are not in use at a stage of initial setting, the copy-source apparatus 110 generates the empty evacuation buffer management table 530 having all bits set equal to "0".

(3) Processing for Initializing Buffer Threshold

Figure 19:
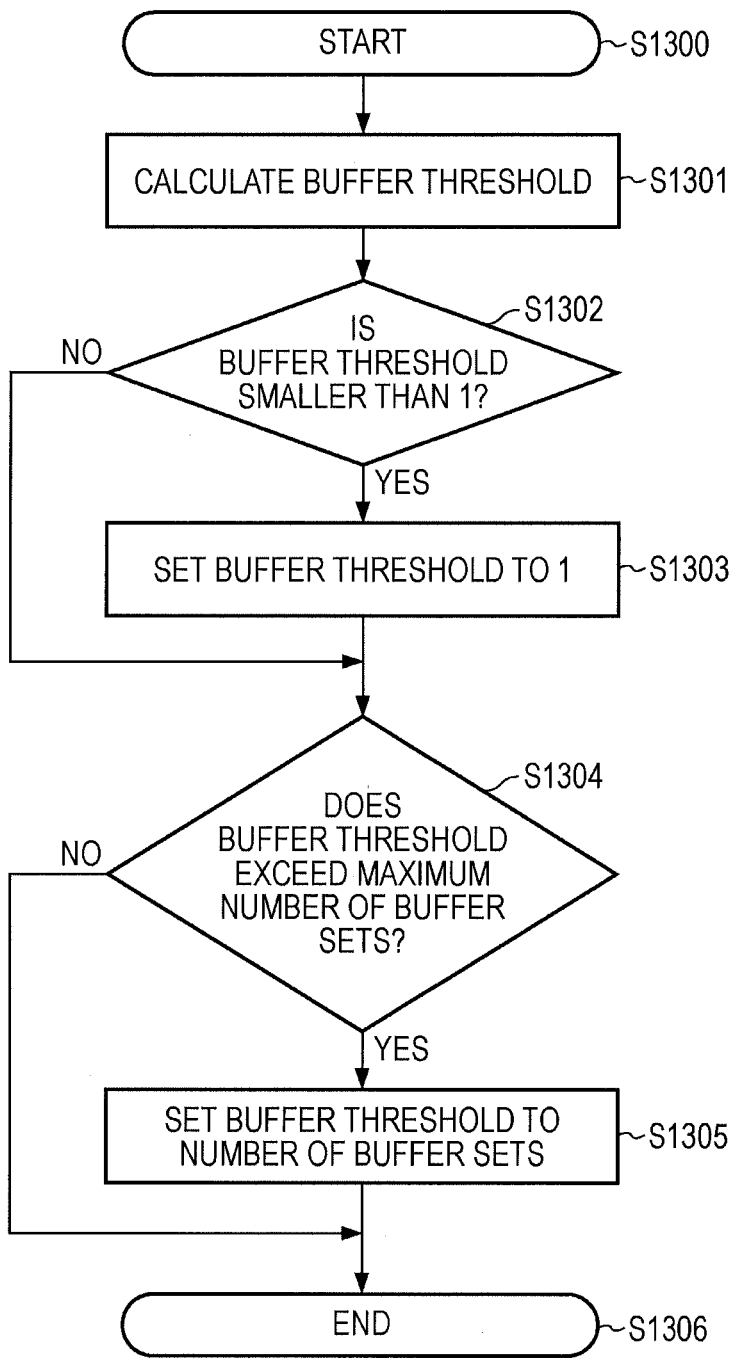
FIG. 19 is a flowchart illustrating processing for initializing a buffer threshold.

FIG. 19 is a flowchart of the processing for initializing the buffer threshold according to this embodiment. The processing illustrated in FIG. 19 can be executed during booting and maintenance of the copy-source apparatus 110, for example.

In STEP S1301, the copy-source apparatus 110 reads out, from a predetermined address of the memory 200, the number of control modules (CTRL_CNT), the buffer size (BUFF_SIZE) [MB], the buffer set size (1GENE_SIZE) [MB], a line bandwidth (BANDWIDTH) [MB/S], transfer efficiency (TRANS_RATIO), control efficiency (SYSTEM_RATIO), a data compression ratio (COMPRESS) [%], and a number of corrected transmission buffers (BUFF_ALPHA).

The number of control modules (CTRL_CNT) indicates the number of control modules included in the copy-source apparatus 110. The buffer size (BUFF_SIZE) indicates a sum of the sizes of the buffers 201a included in the control modules. The buffer set size (1GENE_SIZE) indicates a buffer set size for one generation.

The line bandwidth (BANDWIDTH) indicates a bandwidth available to the network or the dedicated line 130 connecting the copy-source apparatus 110 and the copy-destination apparatus 120.

The transfer efficiency indicates the efficiency of the transfer processing performed between the copy-source apparatus 110 and the copy-destination apparatus 120. For example, when a logical transfer speed is equal to 100 Mbps and an average of an actually measured transfer speed is equal to 75 Mbps, the transfer efficiency is equal to 0.75.

The control efficiency (SYSTEM_RATIO) is generally set to 1. For example, the control efficiency is used to adjust the buffer threshold depending on data transfer efficiency between the host 150 and the copy-source apparatus 110, transfer efficiency between the control modules, and data transfer efficiency between the control modules and the evacuation buffer 118.

The data compression ratio (COMPRESS) indicates a compression ratio of data transmitted to the copy-destination apparatus 120. The correction value (BUFF_ALPHA) is used for adjusting the buffer threshold as needed.

After reading out the above-described pieces of data, the copy-source apparatus 110 calculates the buffer threshold (THRESHOLD) using a following equation and the process then precede to STEP S1302 in the copy-source apparatus 110.

$$\text{THRESHOLD} = ((\text{BANDWIDTH} \times \text{TRANS\_RATIO} \times \text{SYSTEM\_RATIO}) \div (1\text{GENE\_SIZE}) \times (\text{COMPRESS} \div 100) \times \text{CTRL\_CNT}) + \text{BUFF\_ALPHA}) \times 2 \quad (1)$$

In STEP S1302, the copy-source apparatus 110 determines whether the buffer threshold is smaller than 1. If the buffer threshold is smaller than 1 (YES in STEP S1302), the process proceeds to STEP S1303 in the copy-source apparatus 110. In this case, the copy-source apparatus 110 sets the buffer threshold to 1 (STEP S1303) before the process proceeds to STEP S1304.

If the copy-source apparatus 110 determines in STEP S1302 that the buffer threshold is not smaller than 1 (NO in STEP S1302), the process proceeds to STEP S1304.

In STEP S1304, the copy-source apparatus 110 determines whether the buffer threshold exceeds the maximum number of buffer sets. If the buffer threshold exceeds the maximum number of buffer sets (YES in STEP S1304), the process proceeds to STEP S1305 in the copy-source apparatus 110. In this case, the copy-source apparatus 110 sets the buffer threshold to the maximum number of buffer sets (STEP S1305) before the process proceeds to STEP S1306.

If it is determined in STEP S1304 that the buffer threshold does not exceed the maximum number of buffer sets (NO in STEP S1304), the process proceeds to STEP S1306.

After finishing the foregoing processing, the copy-source apparatus 110 terminates the processing for initializing the buffer threshold.

(4) Processing for Switching Buffer Set

Figure 20:
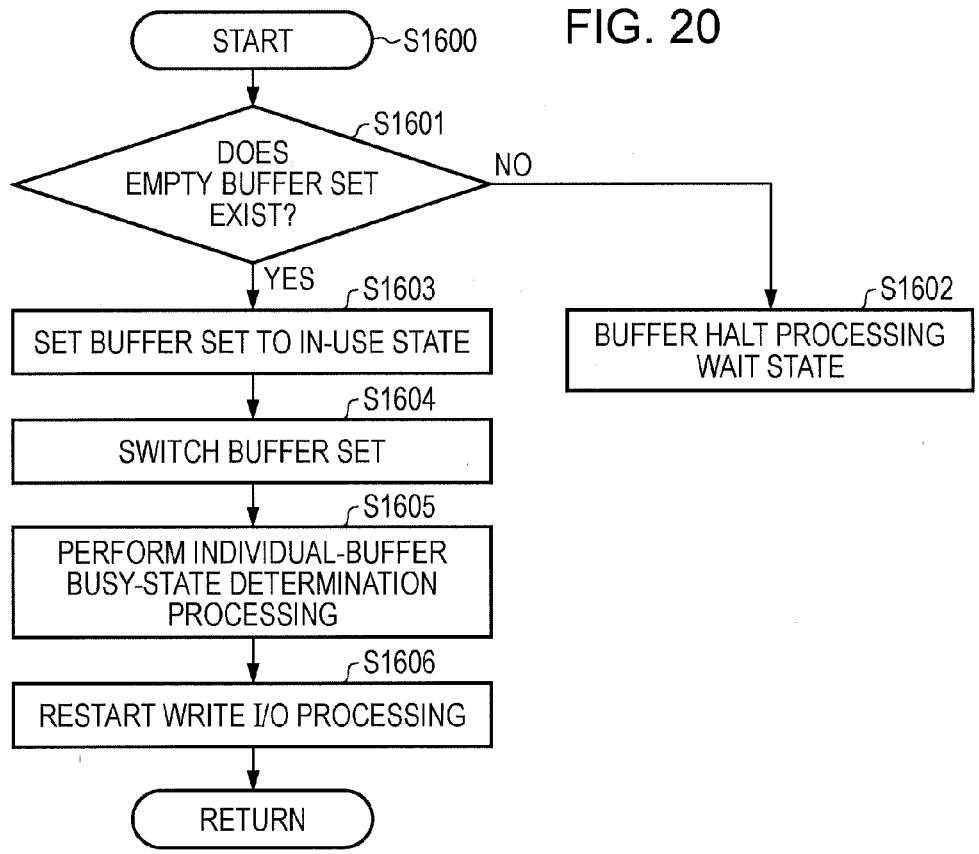
FIG. 20 is a flowchart illustrating processing for switching a buffer set.

FIG. 20 is a flowchart illustrating the processing for switching the buffer set according to this embodiment.

The processing illustrated in FIG. 20 describes a detail of the processing of STEP S1208a illustrated in FIG. 15.

For example, if empty individual buffers in the buffer set are used up in the storage processing in response to the write I/O instruction or the predetermined time has passed since the last buffer set switching processing, the copy-source apparatus 110 starts the processing for switching the buffer set (STEP S1600).

In STEP S1601, the copy-source apparatus 110 determines whether an empty buffer set, i.e., an "unused" buffer set in the buffer set management table 400, exists.

If it is determined in STEP S1601 that no empty buffer set exists (NO in STEP S1601), the process proceeds to STEP S1602 and the copy-source apparatus 110 shifts into a buffer halt processing wait state (STEP S1602). If the buffer use up state is solved after execution of the buffer halt processing, the copy-source apparatus 110 restarts processing the write I/O instruction.

In this case, the copy-source apparatus 110 writes information, such as write data, stored in the buffer set back to a bit map. The copy-source apparatus 110 transfers the data for non-order-ensuring remote copy in accordance with the bit map after executing the buffer halt processing.

If it is determined in STEP S1601 that an empty buffer set exists (YES in STEP S1601), the process proceeds to STEP S1603 in the copy-source apparatus 110.

In STEP S1603, the copy-source apparatus 110 selects one of the empty buffer sets and changes the status of the empty buffer set to "in-use". The copy-source apparatus 110 also sets "staging", "write back", or "storage" in the use purpose of the buffer set management table 400 as needed (STEP S1603). Additionally, the copy-source apparatus 110 switches the buffer set to the selected empty buffer set (STEP S1604).

After completing the processing of STEP S1604, the copy-source apparatus 110 performs processing for determining a busy state of an individual buffer (STEP S1605).

The processing for determining the busy state of the individual buffer will be described using FIG. 21.

This processing includes reflecting the state of the buffer set in the buffer set management table 400 before switching the buffer set to the empty buffer set.

In the processing for determining the busy state of the individual buffer, the copy-source apparatus 110 confirms whether the buffer set used for accumulation is switched because of storage of the copy-target data. That is, the copy-source apparatus 110 checks whether it has determined "NO" in STEP S1205a illustrated in FIG. 15. More specifically, because switching of the buffer set may occur in the processing performed in STEP S1206a even when the storage area still remains, the processing of STEP S1651 is performed to discriminate such a case.

If "NO" is selected in STEP S1651, the copy-source apparatus 110 updates the status of the buffer set management table 400 of the target buffer set to "NORMAL" because access to the buffer set is low. The copy-source apparatus 110 then terminates the processing (S1652).

In contrast, if "YES" is selected in STEP S1651, the copy-source apparatus 110 ads values for the date and the day in the date-based point table 430 and the day-based point table 440 for the corresponding time (STEP S1653).

The copy-source apparatus 110 updates the status of the buffer set management table 400 corresponding to the target buffer set to "BUSY" and then terminates the processing (STEP S1654).

Referring back to the flowchart of FIG. 20, after executing the processing in STEP S1605, the copy-source apparatus 110 restarts processing the write I/O instruction in the wait state with reference to a queue for managing write I/O instructions (STEP S1606).

After finishing the foregoing processing, the copy-source apparatus 110 terminates the processing for switching the buffer set.

(5) Processing for Updating Write Back Pointer Information and Stage Pointer Information In the buffer write back processing according to this embodiment, a write position (a generation) of data stored in the evacuation buffer 118 and a read position (a generation) of data read out from the evacuation buffer 118 are managed using two pieces of information, i.e., the write back pointer information and the stage pointer information.

For example, suppose that the control module has switched the buffer set "x" times. In this case, the stage pointer information holds a generation subjected to the last staging as the information, whereas the write back pointer information stores a generation "x" stored in the evacuation buffer 118 as the information.

A case will now be discussed where buffer set data of the generation "x" is immediately transferred to the copy-destination apparatus 120 when the buffer set is switched "x+1" times by the control module. In this case, after staging and transfer processing of the buffer set data stored at the generation "x" completes, the stage pointer information is updated from the generation "x" to a generation "x+1". The write back pointer information holds the generation "x+1" of the evacuation buffer 118 as the information.

A case will now be discussed where the generation "x+1" is written back to the evacuation buffer 118 when the buffer set is switched "x+2" times in the control module. In this case, if the generation of the evacuation buffer 118 held in the stage pointer information is the generation "x", the generation "x+1" is subjected to the next staging. The write back pointer information holds the generation "x+2" of the volume group.

As described above, the write back pointer information holds the next generation of the current buffer set every time a buffer set is generated. The stage pointer information is updated every time the processing on the switched older-generation buffer set completes, e.g., every time the copy-source apparatus 110 completes transfer of the buffer set data and the copy-destination apparatus 120 completes loading of the buffer set data.

When a plurality of volume groups are assigned as the evacuation buffer 118, the volume groups are used in an ascending order of the numbers assigned thereto. If the last volume group is used up, the volume group returns to the first one. In this way, the volume groups are cyclically used.

Figure 22:
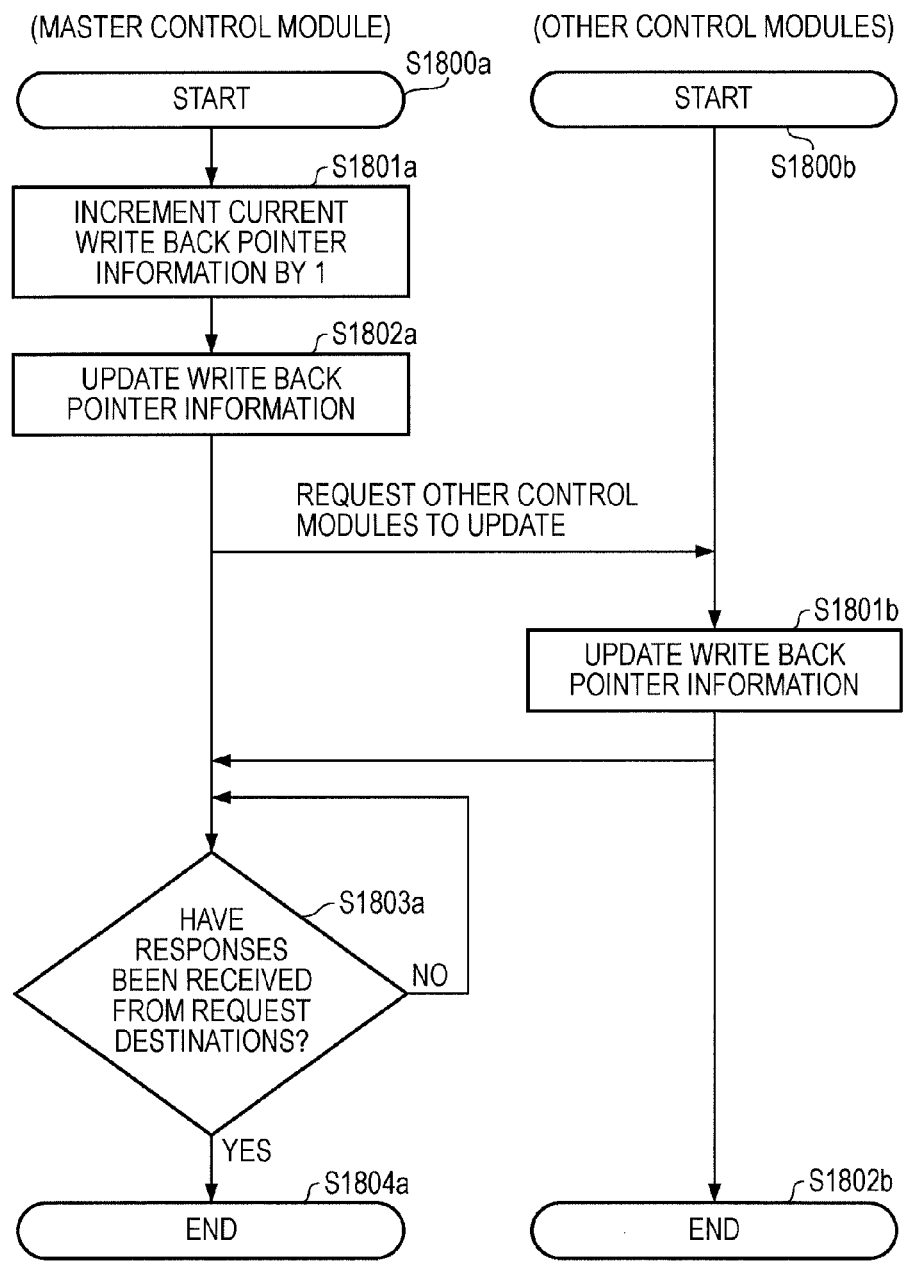
FIG. 22 is a flowchart illustrating processing for updating write back pointer information.
Figure 23:
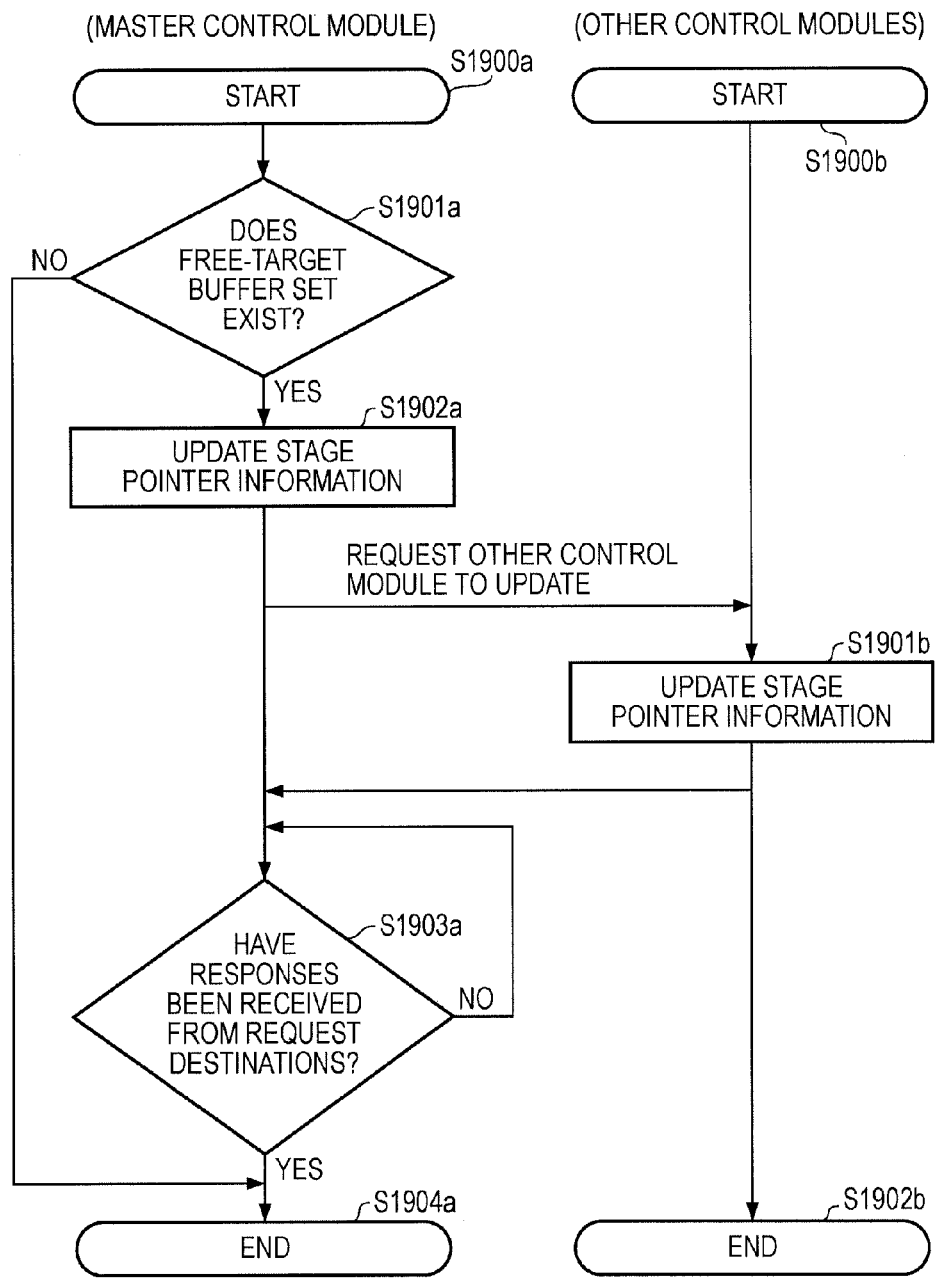
FIG. 23 is a flowchart illustrating processing for updating stage pointer information.

FIGS. 22 and 23 describe details of the processing for updating the write back pointer information and the stage pointer information below, respectively.

FIG. 22 is a flowchart illustrating the processing for updating the write back pointer information according to this embodiment.

After a master control module representing the control modules of the copy-source apparatus 110 performs the buffer set switching processing in STEP S1800a, the process proceeds to STEP S1801a.

In STEP S1801a, the master control module increments the currently held write back pointer information by 1. For example, the master control module increments the generation held in the write back pointer information of the buffer management table 300 by 1.

In STEP S1802a, the master control module updates the write back pointer information determined in STEP S1801a in the buffer management table 300 thereof. The master control module also requests the other control modules of the copy-source apparatus 110 to perform processing similar to the one performed in STEP S1802a.

In STEP S1801b, each of the other control modules updates the write-back pointer information determined in STEP S1801a in the buffer management table 300 thereof. After completing the update of the buffer management table 300, each of the other control modules notifies the master control module of the completion.

In STEP S1803a, the master control module determines whether it has received responses from all of the requested control modules. If there is a control module from which the master control module has not received the response (NO in STEP S1803a), the master control module repeats the processing of STEP S1803a.

If the master control module determines in STEP S1803a that it has received the responses from all of the requested control modules (YES in STEP S1803a), the process proceeds to STEP S1804a and the master control module terminates the processing for updating the write back pointer information.

FIG. 23 is a flowchart illustrating the processing for updating the stage pointer information according to this embodiment.

After the master control module of the copy-source apparatus 110 starts processing for freeing the buffer set in STEP S1900a, the process proceeds to STEP S1901a.

In STEP S1901a, the master control module determines whether a free-target buffer set exists. If no free-target buffer set exists (NO in STEP S1901a), the process proceeds to STEP S1904a and the master control module terminates the processing.

In this embodiment, the copy-source apparatus 110 determines, as a free-target area, a buffer set whose buffer set data has been transferred to the copy-destination apparatus 120 and the copy-source apparatus 110 has received from the copy-destination apparatus 120 a notification of completion of loading of the transferred data in the disk device.

If the master control module determines in STEP S1901a that the free-target buffer set exists (YES in STEP S1901a), the process proceeds to STEP S1902a.

In STEP S1902a, the master control module frees the individual buffer, the BIT, and the buffer set information of the free-target buffer set and updates the stage pointer information. For example, the master control module updates the generation held in the stage pointer information of the buffer management table 300 to the next one.

The master control module also requests the other control modules of the copy-source apparatus 110 to perform processing similar to the one performed in STEP S1902a.

Upon receiving the request from the master control module, each of the other control modules frees the individual buffer, the BIT, and the buffer set information of the free-target buffer set and updates the stage pointer information in STEP S1901b. After completing the processing, each of the other control modules notifies the master control module of the completion.

In STEP S1903a, the master control module confirms the responses from the requested control modules to determine whether it has received the responses from all of the control modules. If there is a control module from which the master control module has not received the response (NO in STEP S1903a), the master control module repeats the processing of STEP S1903a.

If the master control module determines in STEP S1903a that it has received the responses from all of the control modules (YES in STEP S1903a), the process proceeds to STEP S1904a and the master control module terminates the processing for updating the stage pointer information.

(6) Writing Back from Recording Buffer 201 to Evacuation Buffer 118

Figure 24:
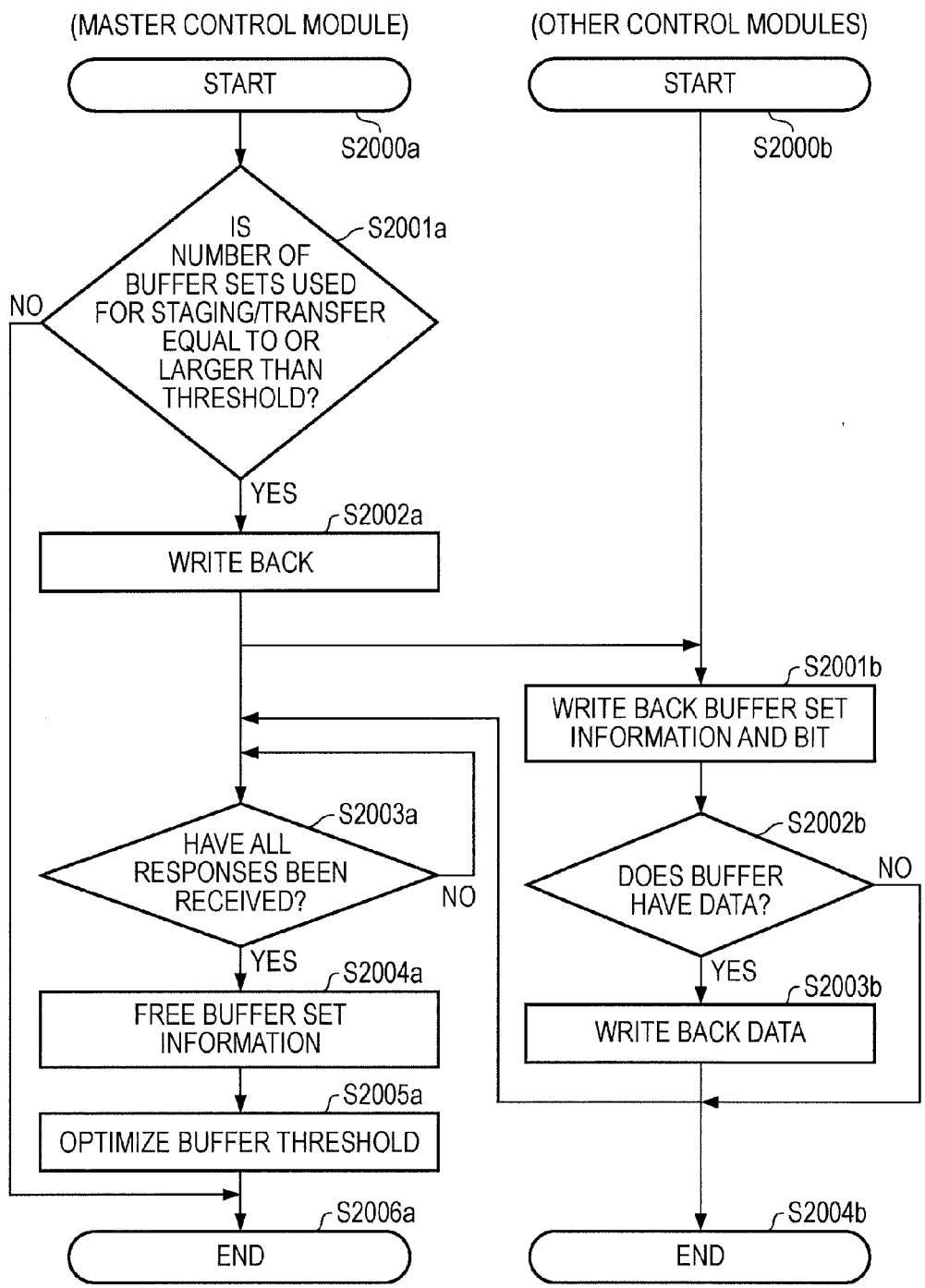
FIG. 24 is a flowchart illustrating write back processing.

FIG. 24 is a flowchart illustrating write back processing according to this embodiment.

After completion of processing for storing write data in a buffer set, for example, in STEP S2000a, the process proceeds to S2001a in the master control module of the copy-source apparatus 110.

In STEP S2001a, the master control module acquires the number of buffer sets in use for staging/transfer. The master control module then compares the number of the buffer sets in use for staging/transfer with the buffer threshold. If the number of in-use buffer sets is not equal to or larger than the buffer threshold (NO in STEP S2001a), the process proceeds to STEP S2006a. If the number of buffer sets in use for staging/ transfer is equal to or larger than the buffer threshold (YES in STEP S2001*a*), the process proceeds to STEP S2002*a* in the master control module.

In STEP S2002*a*, the master control module performs write back processing. The buffer set subjected to the write back processing is referred to as a "write-back-target generation". A detail of the write back processing will be described later.

After completing the write back processing, the master control module requests the other control modules of the copy-source apparatus 110 to perform processing similar to the one performed in STEP S2002*a*.

In STEP S2001*b*, each of the other control modules acquires buffer data stored in the individual buffer thereof belonging to the buffer set requested from the master control module and the BIT and the buffer set information from the BIT storage unit 201*b* thereof. Each of the other control modules then writes back the acquired BIT and buffer set information in an individual evacuation buffer assigned to the control module.

If the individual buffer does not have the buffer data, such as write data, (NO in STEP S2002*b*), each of the other control modules skips STEP S2003*b*. If the individual buffer has the buffer data, such as the write data, (YES in STEP S2002*b*), the process proceeds to STEP S2003*b* in each of the other control modules.

In STEP S2003*b*, each of the other control modules writes back the buffer data, such as the write data, stored in the individual buffer in an individual evacuation buffer of the evacuation buffer 118 assigned to the control module. Each of the control modules then notifies the master control module of the completion of the requested processing.

In STEP S2003*a*, the master control module checks whether it has received responses from all of the requested control modules. If there is a control module from which the master control module has not received the response (NO in STEP S2003*a*), the master control module repeats the processing of STEP S2003*a*.

If the master control module has received the responses from all of the control modules (YES in STEP S2003*a*), the master control module frees the buffer set information of the write-back-target buffer set (STEP S2004*a*). The master control module also sets the buffer set ID matching the buffer set ID of the write-back-target buffer set to the unused state with reference to the buffer set management table 400.

In STEP S2005*a*, the master control module executes processing for optimizing the buffer threshold. The process then proceeds to STEP S2006*a* and the master control module terminates the buffer write back processing.

The above-described write-back processing performed in STEP S2002*a* will be described using flowcharts of FIGS. 25 and 26.

Figure 25:
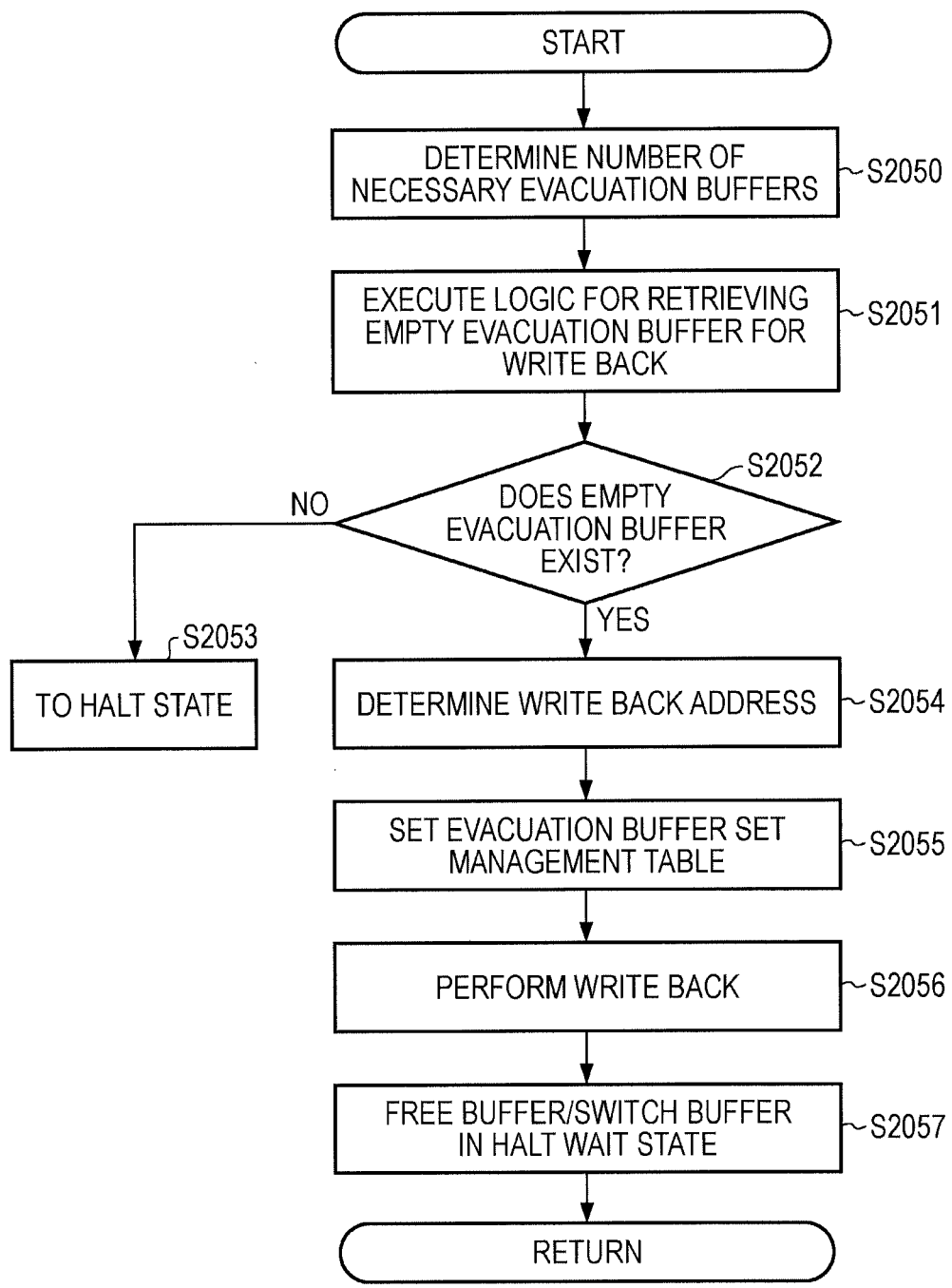
FIG. 25 is a flowchart illustrating a detail of write back processing.
Figure 26:
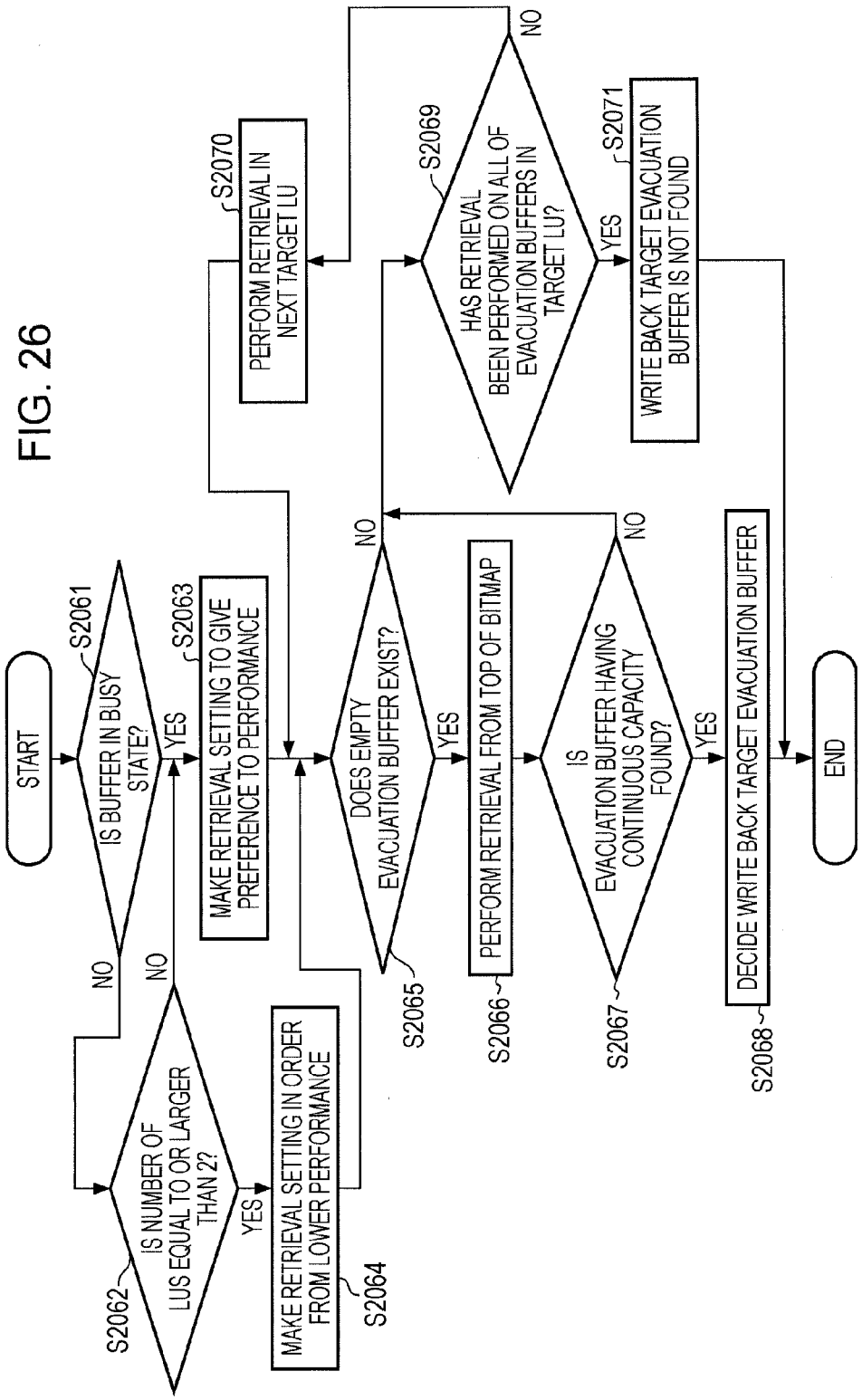
FIG. 26 is a flowchart illustrating processing for retrieving an empty write-back evacuation buffer.

Referring first to FIG. 25, the master control module determines how many times the write back processing is needed (STEP S2050). More specifically, the master control module determines a sum of the numbers of stored buffer set IDs subjected to the write-back processing among the buffer sets managed in the buffer set management table 400 illustrated in FIG. 4. Referring to FIG. 4, the use purpose of the buffer set IDs 0003 and 0004 is set to "write back" and a sum of the numbers of pieces of stored data is equal to 760.

The master control module then determines the number of evacuation buffers needed for the write back processing based on the sum of the numbers of pieces of stored data subjected to the write back processing. At this time, one evacuation buffer is acquired for data having a size smaller than the unit size of the evacuation buffer. In this embodiment, the unit size of the evacuation buffer is equal to 1 MB as illustrated in FIG. 8. Since the storage size is equal to 8 KB as illustrated in the order-ensuring remote copy management table 410 in FIG. 5, the master control module performs a calculation of (760×8)1024=5.9375, rounds up the fractional part, and determines the number of needed evacuation buffers "6".

The master control module then retrieves an empty evacuation buffer for write back (STEP S2051). In this processing, the write-back target evacuation buffer is retrieved for the control module having a busy cache, i.e., a full cache. This processing will be described later. The master control module stores the retrieval result as the empty evacuation buffer information in the evacuation buffer table storage unit 205. The empty evacuation buffer information stored at this time includes a logical unit number (LU No.) of the retrieved buffer and an evacuation buffer offset for the LU number. The master control module also stores information indicating "NO VACANCY" in the empty evacuation buffer information if the empty evacuation buffer is not found.

The master control module confirms whether the empty evacuation buffer is found in the processing performed in STEP S2051 (STEP S2052). More specifically, the master control module determines whether the empty evacuation buffer information indicates "NO TARGET". If the empty evacuation buffer set is not found, i.e., the empty evacuation buffer information indicates "NO TARGET", the master control module terminates the processing and shifts into the halt state (STEP S2053).

If the master control module determines that an empty evacuation buffer exists in STEP S2052, i.e., the empty evacuation buffer information includes the logical unit number of the empty evacuation buffer and the evacuation buffer offset for the LU number, the master control module performs processing of STEP S2054. More specifically, the master control module extracts address information with reference to the empty evacuation buffer information (i.e., the evacuation buffer offset for the LU number and the number of evacuation buffers) stored in the processing of STEP S2051 (STEP S2054).

The master control module then sets this address in the evacuation buffer set management table 520 (S2055). The master control module transfers the write-back-target data of the individual buffer 201*a* to the corresponding address of the logical unit indicated by the logical unit number managed thereby with reference to the evacuation buffer set management table 520. The master control module also notifies the other control modules of the set evacuation buffer set management table 520. Furthermore, the master control module updates the use state of the evacuation buffer used for write back to "1 (in-use)" in the empty evacuation buffer management table 530 for each LU (STEP S2056).

After completing this processing, the master control module frees the write-back-target individual buffer 201*a* (S2057). At this time, the control module switches the buffer if the halt wait state is detected.

The processing for retrieving the empty evacuation buffer performed in STEP S2051 of the processing illustrated in FIG. 25 will now be described using a flowchart of FIG. 26.

The master control module confirms whether the buffer status is busy (or normal) with reference to the buffer set management table illustrated in FIG. 4 (STEP S2061).

If the buffer status is normal, the master control module confirms whether the number of logical units LUs serving as a target of each control module is equal to or larger than 2 with reference to the empty evacuation buffer management table 530 (STEP S2062). If the buffer status is busy in STEP S2061 or if one logical unit is found in STEP S2062, the master control module performs setting for preferentially selecting the evacuation buffer of the logical unit having better performance (STEP S2063). At this time, the master control module stores the LU number of a logical unit having the best evacuation buffer performance with reference to the evacuation buffer performance of the LU management table 510 of each logical unit. More specifically, in the processing performed in STEP S2063, the master control module stores flag information for preferentially selecting better performance in the evacuation buffer management table storage unit 205. The master control module compares the evacuation buffer performance of the LU management table 510 of each logical unit with one another and stores the number of the logical unit having the best evacuation buffer performance in the evacuation buffer management table storage unit 205 as the retrieval-target logical unit number.

If more than one logical unit is confirmed in STEP S2062, the master control module performs setting for preferentially selecting the evacuation buffer of the logical unit having worse evacuation buffer performance (S2064). At this time, the master control module compares the evacuation buffer performance of the LU management table 510 of each logical unit with one another and stores the logical unit number of the logical unit having the worst evacuation buffer performance. More specifically, in the processing performed in STEP S2064, the master control module stores flag information for preferentially selecting the worse evacuation buffer performance in the evacuation buffer management table storage unit 205. The master control module also compares the evacuation buffer performance of the LU management table 510 of each logical unit with one another and stores the logical unit number having the worst evacuation buffer performance in the evacuation buffer management table storage unit 205 as the retrieval-target logical unit number.

The master control module then confirms whether a continuous empty area can be acquired as an evacuation buffer in the retrieval-target logical unit stored in the evacuation buffer management table storage unit 205 (STEPs S2065-52067). An example of this processing will be described regarding the control module #00. The master control module refers to the empty evacuation buffer table 530 illustrated in FIG. 12. Since a value "1111111111111111100000000011111111 . . . (hereinafter, 1 continues)" is set in the table, the master control module determines that the empty evacuation buffer offset is "16" that is the first offset indicating "0 (empty)" and the number of continuous evacuation buffers from the offset is "8". If there is the continuous empty area that can be allocated as the evacuation buffer, the master control module stores the retrieval-target LU number (in the foregoing example, "#00"), the evacuation buffer offset for the empty area "16", and the number of evacuation buffers "8" in the evacuation buffer management table storage unit 205 as the empty evacuation buffer information (S2068) before terminating the processing.

If the continuous empty area is not found in the retrieval-target logical unit, the master control module sets the next logical unit as the retrieval-target logical unit and performs the processing of STEPs S2065-S2067 (S2069 and S2070).

At this time, when the flag information stored in the evacuation buffer management table storage unit 205 indicates that "worse performance is preferentially selected", the master control module selects a logical unit having the worst performance from the logical units not having undergone the processing of STEPS S2065-S2067. This selection is made with reference to the LU management tables 510 stored in the evacuation buffer management table storage unit 205.

If the flag information stored in the evacuation buffer management table storage unit 205 indicates that "better performance is preferentially selected", the master control module selects a logical unit having the best performance from the logical units not having undergone the processing of STEPs S2065-S2067. This selection is also made with reference to the LU management tables 510 stored in the evacuation buffer management table storage unit 205.

If the continuous empty area is not found even after completion of retrieval in all logical units, the master control module stores information "NO TARGET" as the empty evacuation buffer information and then terminates the processing (STEP S2071).

(7) Processing for Scheduling Relocation

Relocation processing regularly performed in the apparatus will be described using FIGS. 27-29.

The master control module automatically performs scheduling of relocation so that the relocation is automatically performed on a day of the week and at a time period when access to the evacuation buffer is low. The scheduling processing will be described with reference to FIG. 27.

Figure 21:
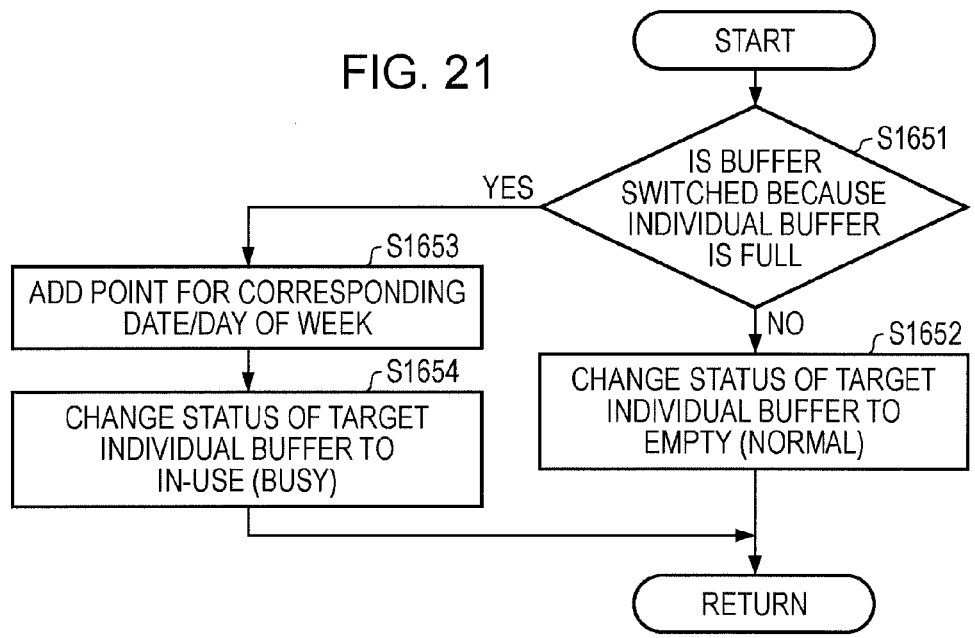
FIG. 21 is a flowchart illustrating processing for determining a buffer busy state.

As described above, the values of the corresponding columns of the date-based point table 430 and the day-based point table 440 are updated in the processing of S1653 illustrated in FIG. 21 every time write back processing occurs because the size of the individual buffer is insufficient.

The master control module accumulates past data of the corresponding timing (STEP S2101). In this embodiment, it is assumed that the date-based point table 430 stores data of past two years. In this case, the master control module reflects the data of the date-based point table 430 for the last year in the date-based point table 430 for this year to perform the accumulation. The day-based point table 440 also stores data of past two weeks. The master control module reflects the data of the day-based point table 440 for the last week in the day-based point table 440 for this week to perform the accumulation.

The master control module then generates a table in a point ascending order on a weekly basis (not illustrated) and then stores the table in the evacuation buffer management table storage unit 205 (STEP S2102).

The master control module performs the scheduling with reference to the table so that the relocation processing is executed at time of a week when the smallest point is observed (STEP S2103).

After this scheduling, the master control module performs the relocation processing at the scheduled time.

The relocation processing will be described with reference to a flowchart of FIG. 28.

The master control module retrieves empty evacuation buffers before relocation (STEP S2201). A detail of this processing will be described later. The master control module stores the retrieval result serving as the empty evacuation buffer information in the evacuation buffer table storage unit 205. The empty evacuation buffer information stored at this time includes the logical unit number (LU No.) of each of the retrieved buffers and the evacuation buffer offset for the LU No. If the empty evacuation buffer is not found, the master control module stores the empty buffer information indicating "NO VACANCY".

The master control module then confirms whether empty evacuation buffers are found in the processing of STEP S2201 (STEP S2202). More specifically, the master control module confirms whether the empty evacuation buffer information indicates "NO VACANCY". If the empty evacuation buffer set is not found, i.e., if the empty evacuation buffer information indicates "NO VACANCY", the master control module terminates the processing because relocation cannot be performed.

If it is determined in STEP S2202 that the empty evacuation buffers can be retrieved, i.e., that the empty evacuation buffer information includes the logical unit numbers of the empty evacuation buffers and the evacuation buffer offsets for the LU numbers, the master control module extracts the logical unit numbers and the addresses from the empty evacuation buffer information determined in STEP S2201 (STEP S2203). The master control module then performs the relocation processing with reference to this information. More specifically, the master control module extracts the evacuation buffer set management table 520 having a set of logical units whose performance is close to the one stored in the empty evacuation buffer information. The master control module then confirms whether, when one of the logical units of the extracted evacuation buffer set management table 520 is replaced with one of the logical unit extracted in STEP S2201, a performance difference between these logical blocks is small. If the performance difference is small, the master control module replaces the logical unit. The master control module also performs the similar processing on the evacuation buffer removed from this evacuation buffer set because of the replacement. The master control module repeats the similar processing thereafter to perform relocation (STEP S2204). After completing the relocation processing, the master control module reflects a result of this relocation processing in each evacuation buffer set management table (STEP S2205). The process then returns to STEP S2201. In this way, relocation is performed on all of the relocatable empty evacuation buffers.

The processing for retrieving an empty buffer subjected to relocation performed in STEP S2201 of FIG. 28 will now be described using a flowchart of FIG. 29.

The master control module confirms whether the number of logical units LU is equal to or larger than 2 with reference to the empty evacuation buffer management table 530 (STEP S2251). If the number of logical units is equal to or larger than 2, the master control module performs a setting for preferentially selecting an evacuation buffer of a logical unit having worse performance (listed at a lower position in the LU management table 510) of the logical units that are not retrieved (STEP S2252). If it is determined in STEP S2251 that the number of logical units is less than 2, the master control module terminates the processing because relocation is not needed. The master control module then confirms whether the retrieval-target logical unit stored in the evacuation buffer management table storage unit 205 has a continuous empty area that can be allocated as an evacuation buffer (STEPs S2253 and S2254). If the continuous empty area allocatable as the evacuation buffer is found, the master control module stores the retrieval-target LU number and the evacuation buffer offset of the empty area as the empty evacuation buffer information in the evacuation buffer management table storage unit 205 and terminates the processing (STEP S2256).

If the continuous empty area is not found in the retrieval-target logical unit, the master control module sets the next logical unit as the retrieval-target logical unit before performing the processing of STEPs S2252-S2255 (STEP S2257).

If the continuous empty area is not found even after the retrieval has completed on all of the logical units, the master control module stores information indicating "NO TARGET" as the empty evacuation buffer information and then terminates the processing (S2258).

(8) Staging from Evacuation Buffer 118 to Recording Buffer 201

Figure 30:
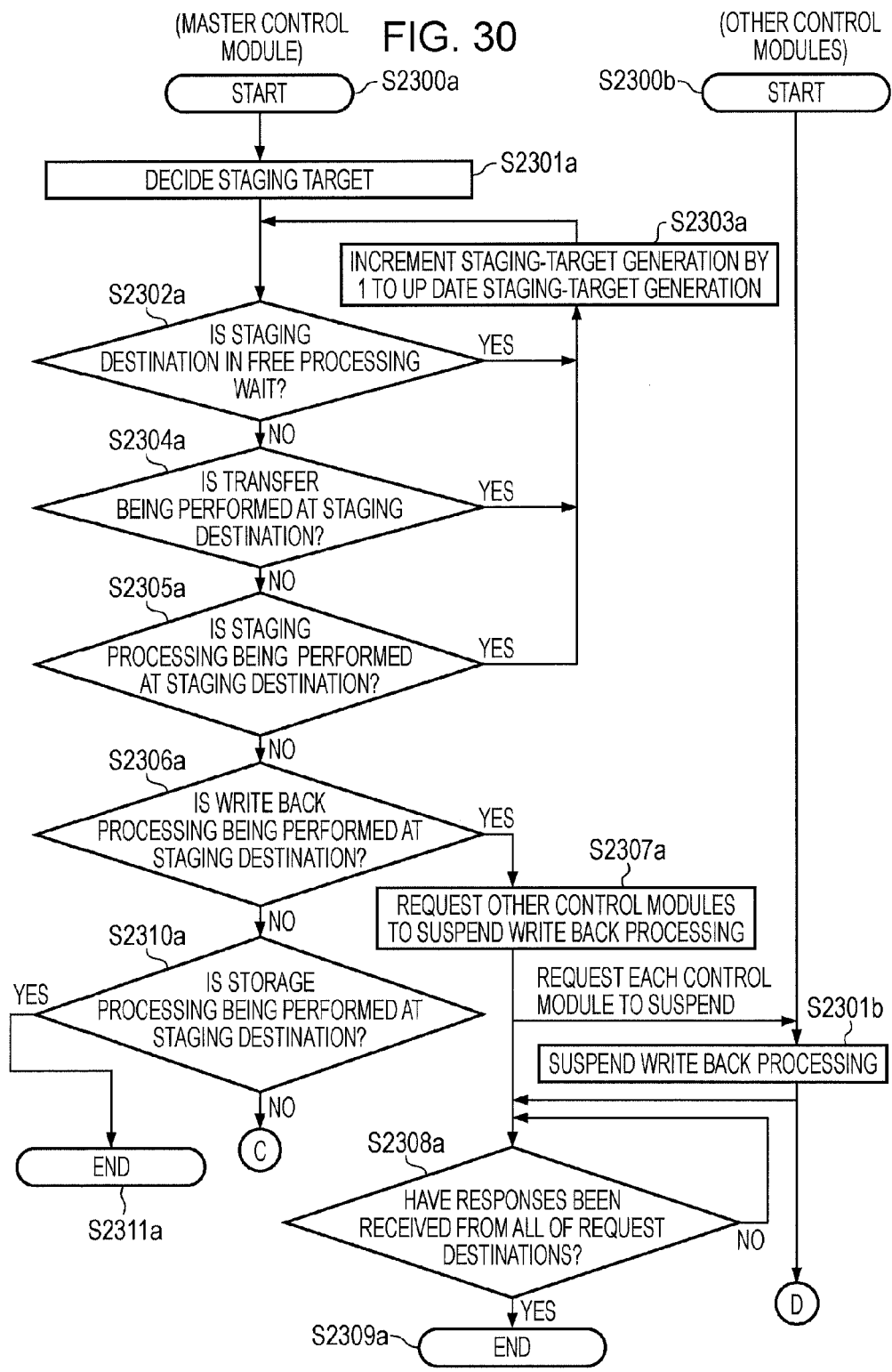
FIG. 30 is a flowchart illustrating staging processing.
Figure 31:
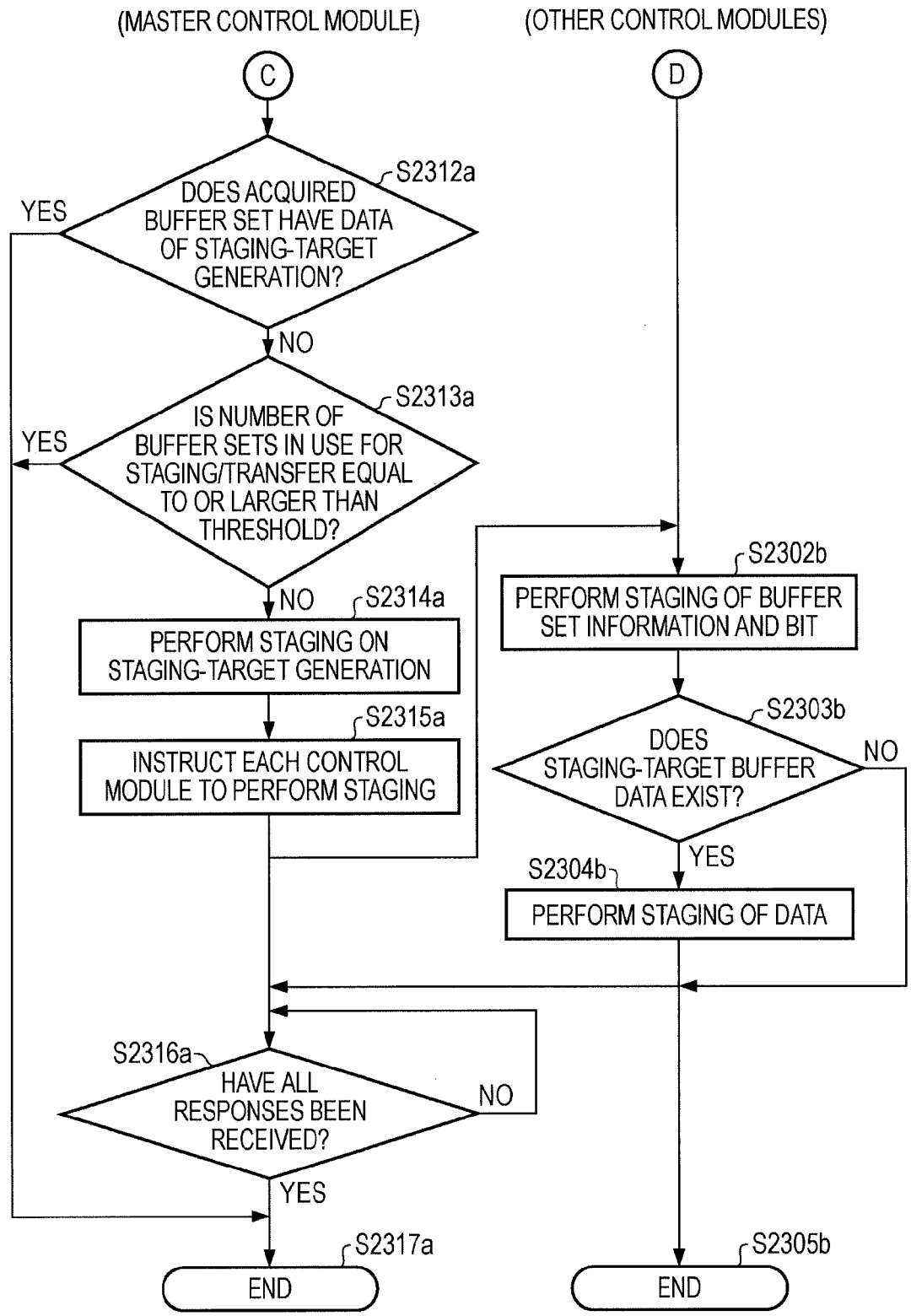
FIG. 31 is a flowchart illustrating staging processing.

FIGS. 30 and 31 are flowcharts illustrating staging processing according to this embodiment. The processing illustrated in FIGS. 30 and 31 is a detail of the processing performed in STEPs S1218a-S1220a illustrated in FIG. 16.

After the master control module of the copy-source apparatus 110 completes the processing for freeing the old generation in STEP S2300a, the process proceeds to STEP S2301a.

In STEP S2301a, the master control module determines a generation subjected to the staging processing. For example, the master control module increments the generation stored in the stage pointer information by 1 with reference to the stage pointer information and determines the incremented generation as a new staging target. The generation subjected to the staging processing is referred to as a "staging-target generation". In the processing illustrated in FIGS. 30 and 31, a buffer set acquired in the processing of STEP S1219a illustrated in FIG. 16 and used for staging is referred to as a "staging destination" as needed.

In STEP S2302a, the master control module checks whether an area of the staging destination of the staging-target generation is waiting to be freed. If the area of the staging destination is waiting to be freed (YES in STEP S2302a), the process proceeds to STEP S2303a in the master control module.

In STEP S2303a, the master control module increments the staging-target generation by 1 and sets the incremented generation as a new staging target generation. The process then returns to STEP S2302a in the master control module.

If it is determined in STEP S2302a that the area of the staging destination is not waiting to be freed (NO in STEP S2302a), the process proceeds to STEP S2304a in the master control module.

In STEP S2304a, the master control module checks whether transfer is being carried out at the staging destination. If the transfer is being carried out at the staging destination (YES in STEP S2304a), the process proceeds to STEP S2303a in the master control module.

If it is determined in STEP S2304a that the transfer is not being carried out at the staging destination (NO in STEP S2304a), the process proceeds to STEP S2305a in the master control module.

In STEP S2305a, the master control module checks whether staging is being performed on the staging-target generation. If the staging is being performed on the staging-target generation (YES in STEP S2305a), the process proceeds to STEP S2303a in the master control module.

If it is determined in STEP S2305a that the stating is not being performed on the staging-target generation (NO in STEP S2305a), the process proceeds to STEP S2306a in the master control module.

In STEP S2306a, the master control module checks whether write back processing is being performed on the staging-target generation. If the write back processing is being performed on the staging-target generation (YES in STEP S2306a), the process proceeds to STEP S2307a in the master control module.

In STEP S2307a, the master control module suspends the write back processing thereof and requests the other control modules of the copy-source apparatus 110 to suspend the write back processing.

Upon receiving the request from the master control module in STEP S2301b, each of the other control modules suspends the write back processing. Each of the control modules then notifies the master control module of the suspension of the write back processing.

In STEP S2308a, the master control module checks whether it has received responses from all of the requested control modules. If there is a control module from which the master control module has not received the response (NO in STEP S2308a), the master control module repeats the processing of STEP S2308a.

If the master control module determines in STEP S2308a that it has received the responses from all of the requested control modules (YES in STEP S2308a), the process proceeds to STEP S2309a and the master control module terminates the staging processing.

If it is determined in STEP S2306a that the write back processing is not being performed on the staging-target generation (NO in STEP S2306a), the process proceeds to STEP S2310a in the master control module.

In STEP S2310a, the master control module checks whether storage of data, such as write data, is being performed at the staging destination. If the storage is being performed at the stating destination (YES in STEP S2310a), the process proceeds to STEP S2311a and the master control module terminates the staging processing.

If it is determined in STEP S2310a that the storage of data, such as write data, is not being performed at the staging destination (NO in STEP S2310a), the process proceeds to STEP S2312a illustrated in FIG. 31 in the master control module.

In STEP S2312a, the master control module checks whether the staging-target generation has been already stored at the staging destination acquired in the processing of STEP S1219a illustrated in FIG. 16.

If the staging target generation has been already stored at the staging destination (YES in STEP S2312a), the process proceeds to STEP S2316a and the master control module terminates the staging processing. If the staging-target generation has not stored at the staging destination (NO in STEP S2312a), the process proceeds to STEP S2313a in the master control module.

In STEP S2313a, the master control module acquires the number of buffer sets in use for staging/transfer. The master control module then compares the number of buffer sets in use for staging/transfer with the buffer threshold. If the number of in-use buffers is equal to or larger than the buffer threshold (YES in STEP S2313a), the process proceeds to STEP S2317a and the master control module terminates the staging processing. If the number of buffer sets in use for the staging/transfer is not equal to or larger than the buffer threshold (NO in STEP S2313a), the process proceeds to STEP S2314a in the master control module.

In STEP S2314a, the master control module performs the staging processing on the staging target generation in a manner described below.

The master control module calculates an address of an individual evacuation buffer storing the staging-target generation based on the evacuation buffer management table 500. The master control module then acquires the buffer data, the BIT, and the buffer set information from the calculated address.

The master control module then stores the acquired buffer data, BIT, and buffer set information in a buffer 201a of a buffer set indicated by the staging target buffer set ID, the BIT storage unit 201b, and the buffer set information storage unit 202, respectively. Each control module of the copy-source apparatus 110 performs the similar processing.

The address of the individual evacuation buffer can be determined by adding "(the staging-target generation−1)×the individual evacuation buffer size" to "the evacuation buffer offset of the evacuated data" set in the evacuation buffer management table 500 when the evacuation buffer assigned to the control module is a continuous address space.

In STEP S2315a, the master control module requests each of the other control modules to acquire the staging-target generation from the evacuation buffer 118 and perform staging processing in a way similar to STEP S2314a.

In STEP S2302b, each control module performs the staging processing on the buffer set information and the BIT in a manner described below.

Each of the control modules having received the request acquires the BIT and the buffer set information of the staging-target generation requested by the master control module from the individual evacuation buffer of the evacuation buffer 118 assigned thereto.

Each control module stores the BIT and buffer set information acquired from the individual evacuation buffer of the evacuation buffer 118 in the BIT storage unit 201b and the buffer set information storage unit 202 thereof, respectively.

In STEP S2303b, each control module determines whether buffer data of the staging target generation exists with reference to the individual evacuation buffer of the evacuation buffer 118 assigned thereto. If the individual evacuation buffer of the evacuation buffer 118 has the buffer data of the staging-target generation (YES in STEP S2303b), each control module performs the staging processing on the buffer data (STEP S2304b). After completing the stating processing, each control module notifies the master control module of the completion.

If it is determined in STEP S2303b that the individual evacuation buffer of the evacuation buffer 118 does not have the buffer data of the staging-target generation (NO in STEP S2303b), each control module notifies the master control module of the completion.

In STEP S2316a, the master control module monitors the completion notification until it receives responses from all of the requested control modules. If the master control module has received the responses from all of the requested control modules (YES in STEP S2316a), the master control module reflects in the empty buffer management table 530 information on the evacuation buffer made available as a result of the staging processing. The process then proceeds to STEP S2317a and the master control module terminates the staging processing. More specifically, the master control module updates the status of the evacuation buffer made available to "0 (empty)" in the empty evacuation buffer management table 530 of each logical unit.

(9) Processing for Optimizing Buffer Threshold

Figure 32:
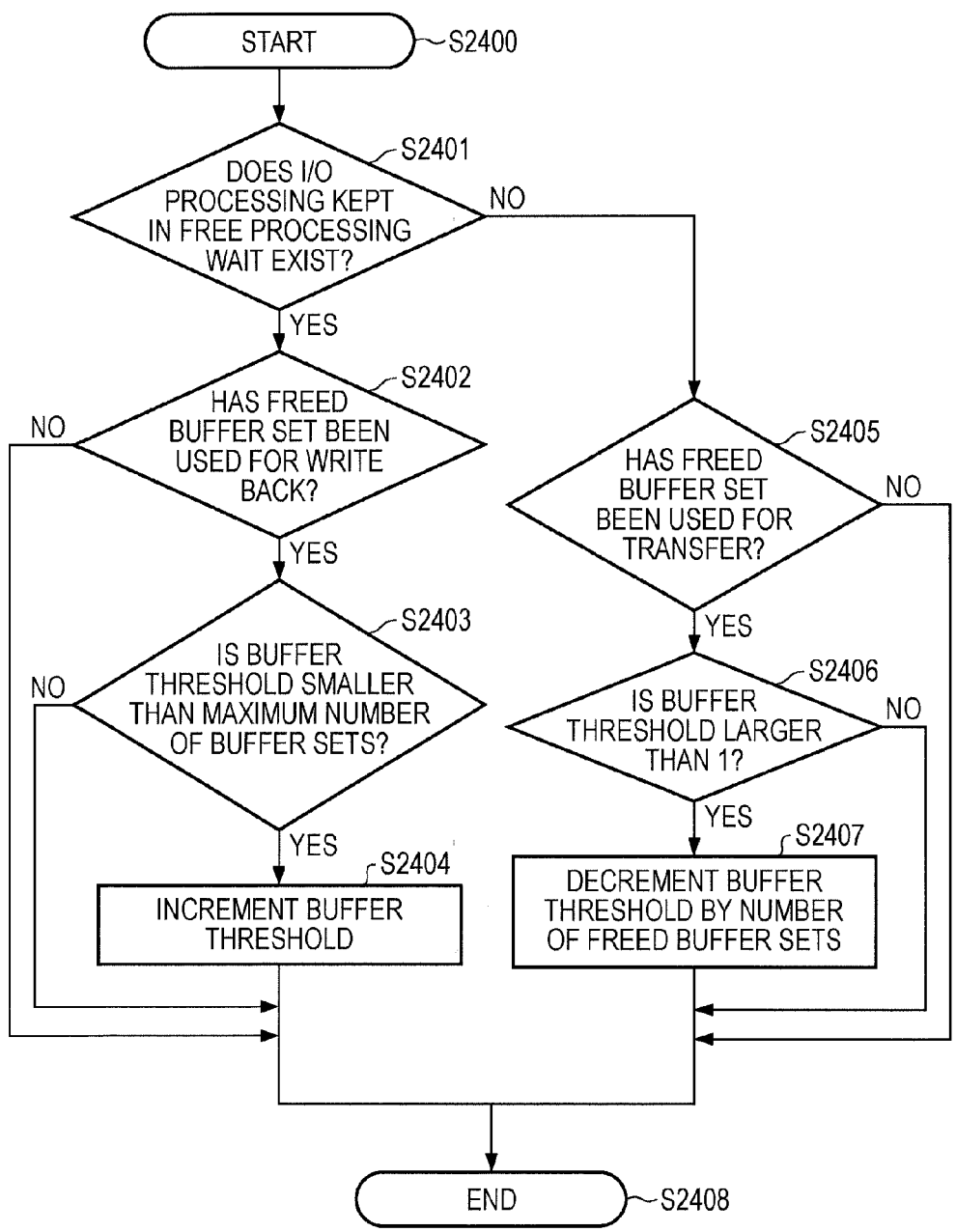
FIG. 32 is a flowchart illustrating processing for optimizing a buffer threshold.

FIG. 32 is a flowchart illustrating the processing for optimizing the buffer threshold according to this embodiment.

After the process proceeds to STEP S1216a illustrated in FIG. 16 or STEP S2005a illustrated in FIG. 24, the master control module starts the processing for optimizing the buffer threshold described below (STEP S2400).

In STEP S2401, the master control module determines whether a write I/O instruction in the wait state exists with reference to a queue for managing write I/O instructions. If the write I/O instruction in the wait state exists (YES in STEP S2401), the process proceeds to STEP S2402 in the master control module.

In STEP S2402, the master control module determines whether the freed buffer set has been used for write back processing. The "freed buffer set" indicates, for example, the buffer set freed in STEP S1214a illustrated in FIG. 16 or STEP S2004a illustrated in FIG. 24 before starting the optimization processing illustrated in FIG. 32.

If the freed buffer set has not been used for the write back processing (NO in STEP S2402), the process proceeds to STEP S2408 and the master control module terminates the processing for optimizing the buffer threshold. If the freed buffer set has been used for the write back processing (YES in STEP S2402), the process proceeds to STEP S2403 in the master control module.

In STEP S2403, the master control module acquires the buffer threshold from the buffer management table 300 and determines whether the buffer threshold is smaller than the maximum number of buffer sets. If the buffer threshold is equal to or larger than the maximum number of buffer sets (NO in STEP S2403), the process proceeds to STEP S2408 and the master control module terminates the processing for optimizing the buffer threshold.

If the buffer threshold is smaller than the maximum number of buffer sets (YES in STEP S2403), the process proceeds to STEP S2404 in the master control module. The master control module increments the buffer threshold by 1 to update the value of the buffer threshold in the buffer management table 300 (STEP S2404). The process then proceeds to STEP S2408 and the master control module terminates the processing for optimizing the buffer threshold.

If it is determined in STEP S2401 that the write I/O instruction in the wait state does not exist, the process proceeds to STEP S2405 in the master control module.

In STEP S2405, the master control module determines whether the freed buffer set has been used for transfer. Just like STEP S2402, the "freed buffer set" indicates, for example, the buffer set freed in STEP S1214a illustrated in FIG. 16 or STEP S2004a illustrated in FIG. 24 before the master control module starts the optimization processing illustrated in FIG. 32.

If the freed buffer set has not been used for transfer (NO in STEP S2405), the process proceeds to STEP S2408 and the master control module terminates the processing for optimizing the buffer threshold. If the freed buffer set has been used for transfer (YES in STEP S2405), the process proceeds to STEP S2406 in the master control module.

In STEP S2406, the master control module acquires the buffer threshold from the buffer management table 300 and determines whether the buffer threshold is larger than 1. If the buffer threshold is equal to or smaller than 1 (NO in STEP S2406), the process proceeds to STEP S2408 and the master control module terminates the processing for optimizing the buffer threshold.

If the buffer threshold is larger than 1 (YES in STEP S2406), the process proceeds to STEP S2407 in the master control module. The master control module decrements the buffer threshold by 1 to update the buffer threshold in the buffer management table 300 (STEP S2407). The process then proceeds to STEP S2408 and the master control module terminates the processing for optimizing the buffer threshold.

Figure 33:
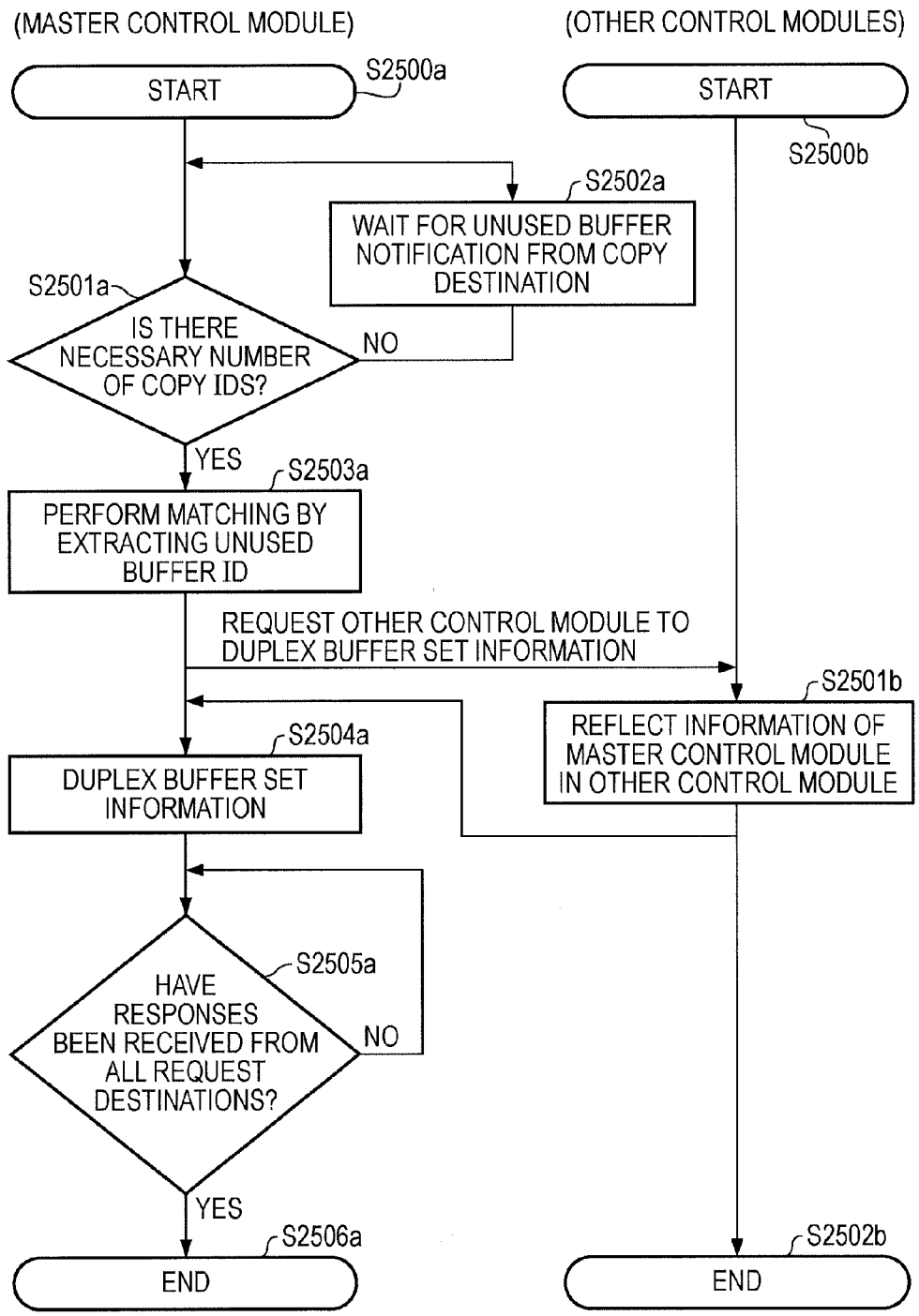
FIG. 33 is a flowchart illustrating a detail of matching processing.

FIG. 33 is a flowchart illustrating a detail of the matching processing (STEP S1211a) illustrated in FIG. 16. FIG. 33 illustrates detailed processing of the master control module and the other control modules of the copy-source apparatus 110.

In STEP S2501a, the master control module refers to the unused buffer ID storage unit 206. The master control module then confirms whether the number of the unused buffer IDs stored in the unused buffer ID storage unit 206 is sufficiently enough for matching of the copy-source IDs included in the buffer set information stored in the buffer set information storage unit 202.

If the sufficiently enough unused buffer IDs are not confirmed in STEP S2501a (NO in STEP S2501a), the process proceeds to STEP S2502a in the master control module. The master control module waits for an unused buffer notification from the copy-destination apparatus 120 in STEP S2502a. Once the master control module receives the unused buffer notification, the process proceeds to STEP S2501a.

If sufficiently enough unused buffer IDs are confirmed in STEP S2501a (YES in STEP S2501a), the process proceeds to STEP S2503a in the master control module.

In STEP S2503a, the master control module acquires as many unused buffer IDs as needed from the unused buffer ID storage unit 206. The master control module then performs association by combining the copy-destination ID included in the buffer set information already stored in the buffer set information storage unit 202 with the acquired unused buffer ID. That is, the master control module performs matching of the copy-source buffer and the copy-destination buffer.

After finishing this matching processing, the master control module requests the other control modules to duplex the buffer set information.

Upon receiving the request for duplexing the buffer set information from the master control module in STEP S2501b, each of the other control modules performs processing for duplexing the buffer set information. The processing for duplexing the buffer set information indicates processing allowing all of the control modules of the copy-source apparatus 110 or the copy-destination apparatus 120 to hold the same buffer set information.

For example, each control module acquires the buffer set information having undergone the matching processing in STEP S2503a from the master control module. The control module then reflects the acquired buffer set information in the buffer set information storage unit 202 thereof.

After finishing the processing for duplexing the buffer set information in STEP S2501b, each control module notifies the master control module of the completion of the processing for duplexing the buffer set information.

In STEP S2505a, the master control module confirms whether it has received responses from all of the control modules that the master control module has requested to perform the processing for duplexing the buffer set information. If the master control module determines that it has received the responses from all of the control modules (YES in STEP S2505a), the master control module terminates processing for assigning the copy-destination buffers (STEP S2506a) and the process proceeds to STEP S1212a illustrated in FIG. 16.

As described above, the copy-source apparatus 110 according to this embodiment includes the evacuation buffer 118.

If the number of buffer sets in use for transfer/staging exceeds the buffer threshold, the copy-source apparatus 110 performs write back processing to evacuate the buffer set data in the evacuation buffer 118.

For example, a case will be discussed where performance of a line between the copy-source apparatus 110 and the copy-destination apparatus 120 is low and the copy-source apparatus 110 receives one write I/O instruction after another from the host 150. In such a case, if the number of in-use buffer sets exceeds the buffer threshold, the copy-source apparatus 110 evacuates the buffer set data in the evacuation buffer 118.

After the processing of transferring and loading the buffer set data in the copy-destination apparatus 120 completes, the copy-source apparatus 110 frees an area storing the buffer set data and performs staging of the buffer set data evacuated in the evacuation buffer 118 to the freed area. The copy-source apparatus 110 then transfers the buffer set data to the copy-destination apparatus 120.

As described above, even when a delay is caused in data transfer processing because of low line performance between the copy-source apparatus 110 and the copy-destination apparatus 120, the copy-source apparatus 110 according to this embodiment can suppress the buffer sets from being run out. Accordingly, the copy-destination apparatus 120 can suppress occurrence of buffer halt processing that is performed when the buffer sets are run out. More specifically, the copy-destination apparatus 120 can suppress content of the buffer sets from being cleared because of the buffer halt processing and the order-ensuring remote copy from being suspended. As a result, even if the delay is caused in the data transfer processing, the copy-source apparatus 110 can perform the order-ensuring remote copy.

The similar advantages are provided when the delay is caused in the data transfer processing because of uneven and unstable line performance or an amount of update data, resulting from write I/O instructions, exceeding the capacity of the recording buffer 201 of the copy-source apparatus 110.

Furthermore, the copy-source apparatus 110 optimizes the buffer threshold in accordance with processing load involving the write I/O processing.

For example, when the write I/O processing in the wait state exists after execution of staging or transfer, the copy-source apparatus 110 increments the buffer threshold. If there is many write I/O processing in the wait state, the buffer threshold is incremented every time the write I/O processing in the wait state is detected after execution of staging or transfer. In this way, the buffer threshold changes and the number of buffer sets for use in write back increases as illustrated in FIG. 26.

As a result, even if the write I/O processing abruptly increases, running out of the buffer sets can be prevented because the buffer set data is evacuated in the evacuation buffer 118.

Additionally, for example, if there is no write I/O processing in the wait state after execution of write back processing of buffer set data, the copy-source apparatus 110 decrements the buffer threshold. If a state in which the write I/O processing in the wait state is not detected continues, the copy-source apparatus decrements the buffer threshold every time the copy-source apparatus 110 executes the transfer processing of the buffer set data. In this way, the buffer threshold changes and the number of buffer sets for use in staging and transfer increases as illustrated in FIG. 25.

As a result, since the processing for transferring the buffer set data is performed while making the maximum use of bandwidth of the communication line, the processing for transferring the buffer set data increases and running out of the buffer sets can be suppressed.

Although FIGS. 30 and 31 illustrates a case where the number of buffer sets is not 4 but 16 for ease of understanding of the operation performed on the buffer threshold, the configuration of the buffer sets is not limited to the one illustrated in FIGS. 30 and 31.

In addition to the foregoing embodiment, an operator of a disk buffer avoids the halt processing by estimating a capacity of the disk buffer sufficiently enough for avoiding the buffer halt processing and performing a fixed setting at the time of installation. However, such a setting is made before an actual operation and may increase a load of some of logical units because of a change in the operation method. Additionally, execution speed decreases because a communication amount at I/O ports of some of the logical units increases.

In such a case, even if the load of other logical units in the same evacuation buffer set as the logical unit having the low execution speed is light or a sufficient capacity is left for I/O processing, processing is performed at the low execution speed in cooperation with the logical unit having the low execution speed. As described above, the low execution speed of the logical unit increases the number of data sets waiting to be transmitted, as a result of which the number of the data sets may exceed the estimated buffer capacity.

Figure 27:
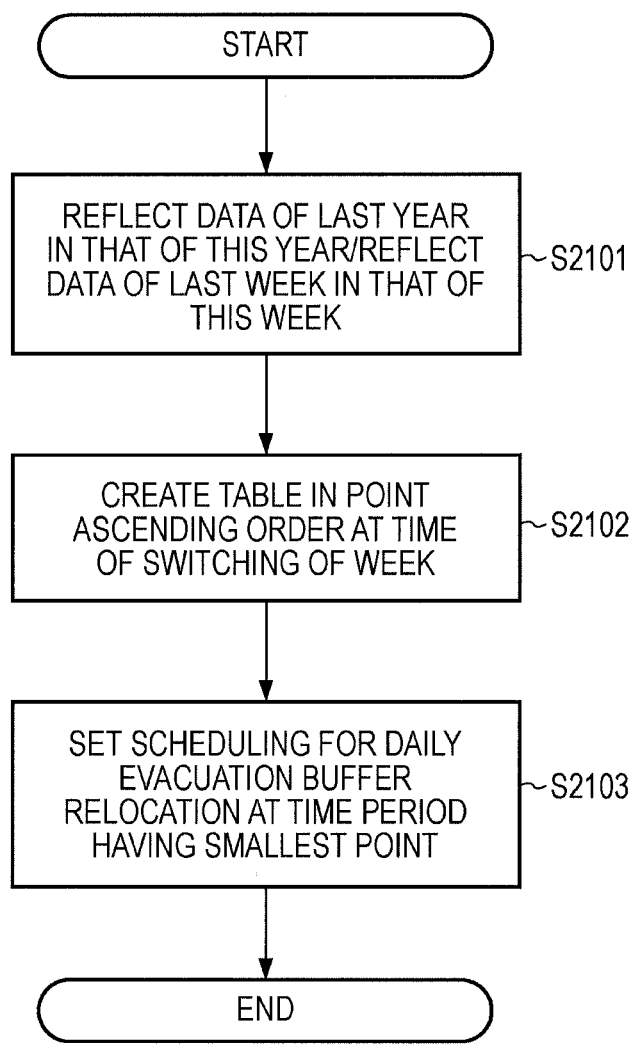
FIG. 27 is a flowchart illustrating processing for scheduling relocation of an evacuation buffer.
Figure 28:
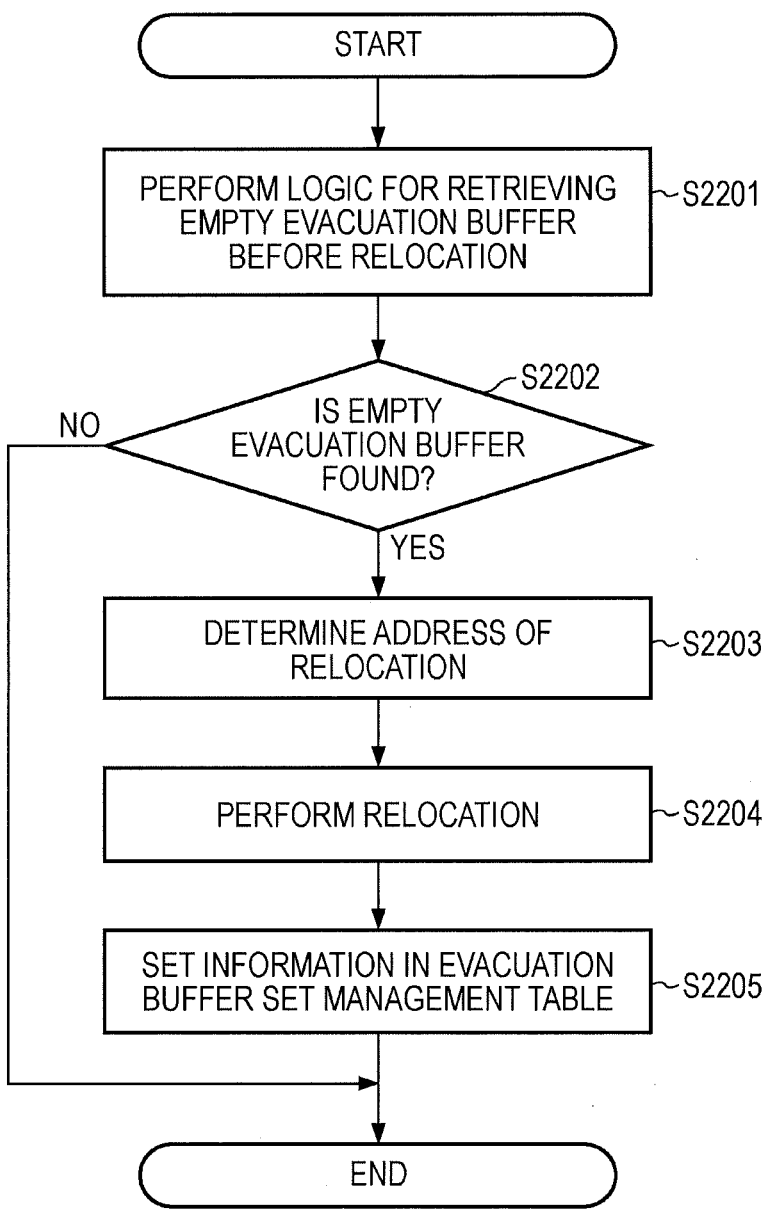
FIG. 28 is a flowchart illustrating processing for relocating an evacuation buffer.
Figure 29:
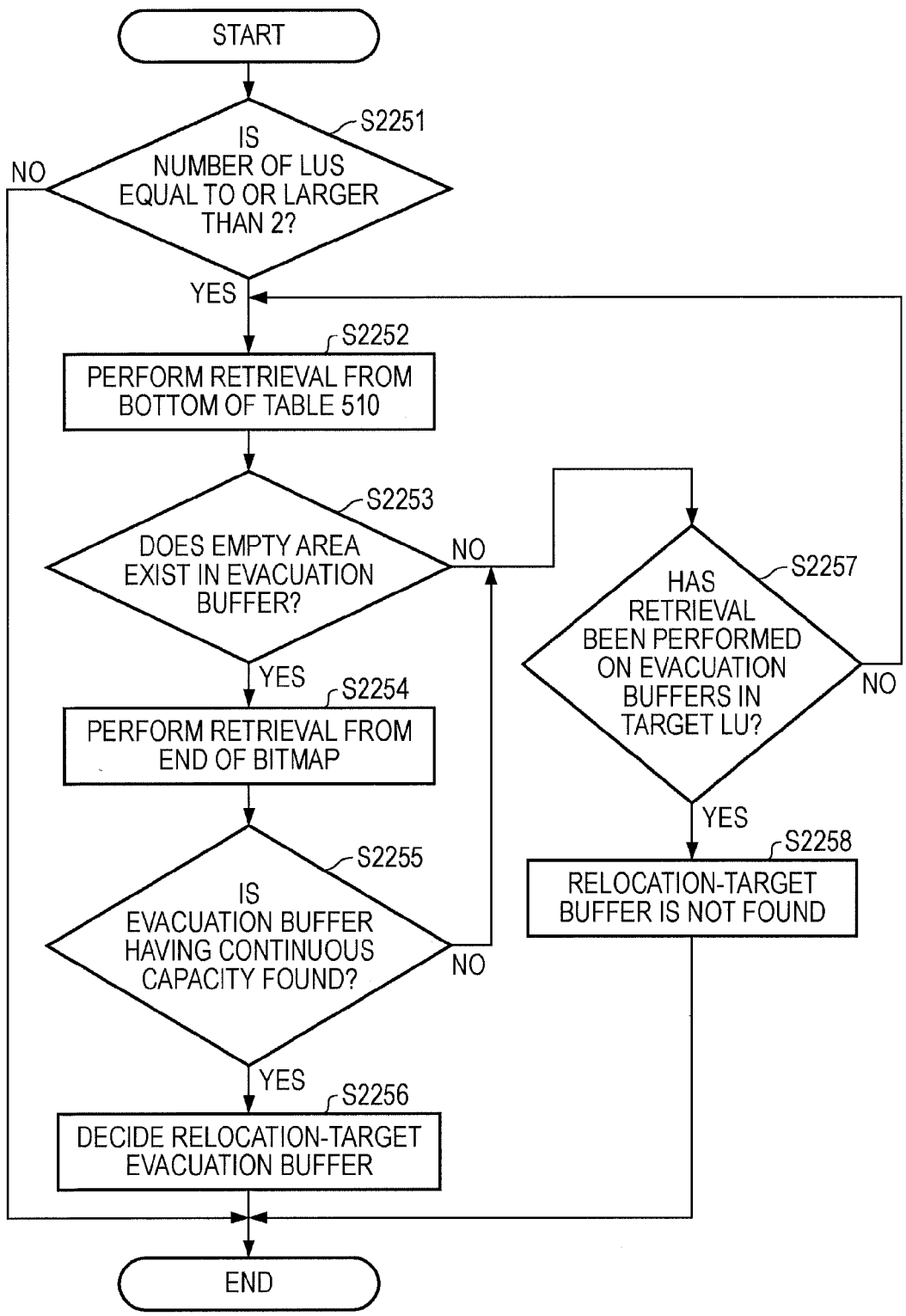
FIG. 29 is a flowchart illustrating processing for retrieving an empty evacuation buffer at the time of relocation.

A storage control apparatus according to this embodiment allocates or relocates each evacuation buffer of a buffer set so that logical unit of the evacuation buffer have uniform write back performance as illustrated in the processing for generating the evacuation buffer set table 520 in FIG. 18 and the relocation processing in FIGS. 27-29. In this way, the storage control apparatus according to this embodiment minimizes a difference between speeds of buffers included in a buffer set.

Furthermore, in accordance with this embodiment, the difference in each evacuation buffer performance included in each evacuation buffer set can be minimized by regularly performed relocation as illustrated in FIGS. 27-29 even if the load and the communication amount of each logical unit change in a system operation.

Moreover, in accordance with this embodiment, the combination of the control module and the logical units is not fixed and the combination thereof differs for each evacuation buffer set. Since each evacuation buffer in an evacuation buffer set is in the same size, a storage capacity of each logical unit is uniform if the logical units are fixed in units of the control modules. Accordingly, even if one logical unit has a larger capacity than another logical unit, an amount of data up to the smaller capacity of the other logical unit can be stored. In contrast, in accordance with this embodiment, since a combination of the logical units is stored in units of buffer sets, the combination of the control module and the logical unit does not have to be fixed. Accordingly, even if the logical units do not have a uniform capacity, the capacity can be efficiently utilized.

Moreover, when a control module is additionally installed in a storage control apparatus having a fixed combination of a control module and a logical unit, an evacuation buffer set cannot be allocated for the additionally installed control module without any additional operation. Accordingly, such a storage control apparatus performs an operation for temporarily clearing out an evacuation buffer stored in the logical unit and then constructing a correspondence of a buffer set for the newly installed control module. In contrast, in accordance with this embodiment, since the logical unit and the control module is not combined in a fixed manner, a buffer set can be easily assigned to the additionally installed control module.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A storage control apparatus to receive data transmitted from an upper-layer apparatus, the storage control apparatus storing the received data in a first storage apparatus, and transmitting the received data to a second storage apparatus, the storage control apparatus comprising:
- a first storage to store data received from the upper-layer apparatus;
- a plurality of the second storages associated with an empty-state management table, the empty-state management table storing information indicating a use state of each storage area of the plurality of the second storages; and
- at least one processor operable to:
  - transmit the data stored in the first storage to the second storage apparatus according to at least one buffer set unit usable to maintain an order that the data is stored in the first storage,
  - transfer and store transfer data stored in the first storage into the second storage when an amount of the data stored in the first storage is larger than a predetermined amount, the transfer data being at least part of the data stored in the first storage,
  - transfer the transfer data stored in the second storage into the first storage when an amount of the data stored in the first storage is smaller than a predetermined amount,
  - retrieve second storages determined to have an empty storage area by referencing the empty-state management table when an amount of the data stored in the first storage is larger than a predetermined amount, the transfer data being at least part of the data stored in the first storage,
  - transfer the transfer data stored in the first storage to the empty storage area of at least one of the second storages,
  - update the information indicating the use state of the empty storage area in the empty-state management table to information indicating an in-use state, and
  - update the information indicating the use state of the storage area in the empty-state management table to information indicating an empty state when the amount of the data stored in the first storage is smaller than the predetermined amount,
- wherein each buffer set unit includes buffer identification information, buffer data and buffer set information indicating a correspondence between buffers.

2. The storage control apparatus according to claim 1, wherein
performance information table data including information on a transfer speed in an evacuation processing is stored, for each of the plurality of second storages, and wherein the at least one processor extracts the second storage having a fastest transfer speed from among the second storages having the empty storage area determined in accordance with the empty-state management table and the performance information table data when the amount of data stored in the first storage is equal to or larger than a predetermined amount.

3. The storage control apparatus according to claim 1, wherein
a buffer set table is stored including buffer set information corresponding each storage area of the plurality of second storages with one another, and
wherein the at least one processor extracts, for all of the associated buffers, with reference to the empty-state management table and the buffer set table, a plurality of the second storages corresponding to each storage area set having buffers with an empty storage area when the amount of data stored in the first storage is equal to or larger than the predetermined amount, and
evacuates, in a distributed manner, at least part of the data stored in the first storage to the empty storage areas of the plurality of second storages.

4. The storage control apparatus according to claim 3, wherein
performance information table data is stored including information on a transfer speed in an evacuation processing, for each of the plurality of second storages, and
wherein the at least one processor associates storage areas of the second storage having a similar transfer speed based on evaluation of the performance information table data and stores information related to a corresponding association in the buffer set table.

5. The storage control apparatus according to claim 4, wherein
evacuation time storage table data is stored including information on time at which the evacuation processing is performed, and
wherein the at least one processor executes the processing based on the evacuation time storage table data.

* * * * *